(12) United States Patent
Carrera et al.

(10) Patent No.: US 12,524,655 B2
(45) Date of Patent: Jan. 13, 2026

(54) ARTIFICIAL NEURAL NETWORK PROCESSING METHODS AND SYSTEM

(71) Applicant: STMICROELECTRONICS S.r.l., Agrate Brianza (IT)

(72) Inventors: Diego Carrera, Lodi (IT); Matteo Colella, Bresso (IT); Giuseppe Desoli, San Fermo Della Battaglia (IT); Giacomo Boracchi, Buccinasco (IT); Beatrice Rossi, Milan (IT); Pasqualina Fragneto, Burago di Molgora (IT); Luca Frittoli, Monza (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 1085 days.

(21) Appl. No.: 17/383,132

(22) Filed: Jul. 22, 2021

(65) Prior Publication Data

US 2022/0027715 A1 Jan. 27, 2022

(30) Foreign Application Priority Data

Jul. 24, 2020 (IT) .................. 102020000018043

(51) Int. Cl.
*G06N 3/063* (2023.01)
*G06F 18/211* (2023.01)
(Continued)

(52) U.S. Cl.
CPC ........... *G06N 3/063* (2013.01); *G06F 18/211* (2023.01); *G06N 3/048* (2023.01)

(58) Field of Classification Search
CPC ....... G06N 3/063; G06N 3/048; G06F 18/211
See application file for complete search history.

(56) References Cited

U.S. PATENT DOCUMENTS

2015/0066460 A1  3/2015  Klinger et al.

FOREIGN PATENT DOCUMENTS

CN  106203624 A  12/2016
CN  108920887 A  11/2018
(Continued)

OTHER PUBLICATIONS

Choi, Yoojin, Mostafa El-Khmay and Jungwon Lee, "Universal Deep Neural Network Compression", May 2020, IEEE, pp. 718-719 (Year: 2020).*

(Continued)

*Primary Examiner* — Shahid K Khan
*Assistant Examiner* — Skylar K Vanwormer
(74) *Attorney, Agent, or Firm* — Seed IP Law Group LLP

(57) ABSTRACT

A method, comprising: providing an ANN processing stage having a plurality of processing layers with respective parameters including at least one set of weight parameters, at least one input, resp. output, activation parameter and at least one activation function parameter; setting to an integer value a dimensional parameter of a lattice having a plurality of lattice points and identified by a set of basis vectors; selecting a set of weight parameters of a respective processing layer; vectorizing the selected set of weight parameters producing a set of weight vectors arranged as items of a matrix of weight vectors; normalizing the matrix of weight vectors; applying lattice vector quantization, LVQ, processing to the matrix of normalized weight vectors, producing a codebook of codewords; indexing by encoding codewords of the codebook as a function of the lattice, producing respective tuples of indices. The normalization comprises solving an optimization problem having a first term configured to provide normalized weight values approximating at least output, as a function of at least one input, activation parameter, and a regularization term $\Omega_L$, configured to amplify weight values having a short distance from the lattice points of the lattice L.

20 Claims, 11 Drawing Sheets

(51) Int. Cl.
  *G06N 3/044* (2023.01)
  *G06N 3/045* (2023.01)
  *G06N 3/0464* (2023.01)
  *G06N 3/048* (2023.01)
  *G06N 3/0495* (2023.01)

(56) References Cited

FOREIGN PATENT DOCUMENTS

| | | | |
|---|---|---|---|
| CN | 111192337 | A | 5/2020 |
| EP | 3346425 | A1 | 7/2018 |
| JP | H08329033 | A | 12/1996 |
| KR | 20000032333 | A | 6/2000 |

OTHER PUBLICATIONS

Salimans, Tim and Diederik P. Kingma, "Weight Normalization: A Simple Reparameterization to Accelerate Training of Deep Neural Networks", 2016, arXiv, pp. 2-3 (Year: 2016).*

Renaut, Rosemary A., Iveta Hnetynkova and Jodi Mead, "Regularization parameter estimation for large-scale Tikhonov regularization using a priori information", 2009, Elsevier, p. 3431 (Year: 2009).*

Sugiyama, Masashi and Hidemitsu Ogawa, "Optimal design of regularization term and regularization parameter by subspace information criterion", 2001, Elsevier (Year: 2001).*

Choi et al., "Universal Deep Neural Network Compression," *IEEE Journal of Selected Topics in Signal Processing* 14(4):715-726, 2020.

Choi et al., "Universal Deep Neural Network Compression," 32nd Conference on Neural Information Processing Systems, Dec. 2-8, 2018, Montréal, Canada, 5 pages.

Conway et al., "Fast Quantizing and Decoding Algorithms for Lattice Quantizers and Codes," *IEEE Transactions on Information Theory IT*—28(2):227-232, Mar. 1982.

Rault et al., "Indexing Algorithms for $Z_n$, $A_n$, $D_n$, and $D_n$++ Lattice Vector Quantizers," IEEE Transactions on Multimedia 3(4):395-404, Dec. 2001.

Moureaux et al., "Low-Complexity Indexing Method for $Z^n$ and $D_n$ Lattice Quantizers," *IEEE Transactions on Communications* 46(12):1602-1609, Dec. 1998.

* cited by examiner

ARTIFICIAL NEURAL NETWORK PROCESSING METHODS AND SYSTEM

BACKGROUND

Technical Field

The description relates to methods and systems for artificial neural network (ANN) processing, such as convolutional neural network (CNN) processing, for instance.

One or more embodiments may be applied to a hardware accelerator engine configured to perform ANN processing, such as neural processing units (NPUs), for instance.

Description of the Related Art

A convolutional (artificial) neural network (briefly, CNN) comprises computer-based tools which exploit deep learning algorithms to perform image processing tasks.

Classifying the image of a big feline as a leopard or a jaguar may be mentioned as an example of such processing.

A CNN comprises a plurality of layers, for instance a plurality of (hidden) processing layers coupled to the input layer and configured to apply data processing to an image tensor received therefrom. Processing layers may comprise convolutional and/or pooling processing, for instance, and the CNN may comprise an output layer coupled to the input layer via the hidden layers.

Convolutional processing layers perform convolution of the input image data with filters, also known as convolution kernels, and apply an activation function to the convolved data, producing a set of features as a result.

Pooling processing layers reduce the dimensions of the set of features by performing sub sampling, such as max or average sampling, for instance.

Processing layers may use up to millions of parametric values, also known as weights. Weight values are learned, that is set, through a training processing phase which may involve large training datasets.

For instance, a CNN can be trained using a plurality of pictures of animals, and it can be configured to identify leopards or jaguars.

As mentioned, millions of weight values may be used in CNN processing, which may use large memory footprints.

Processing layers may involve large numbers of dot product operations between the weights and feature vectors, which may lead to high computation cost.

Existing solutions (as discussed, for instance, in Choi, Y., El-Khamy, M., & Lee, J.: "Universal deep neural network compression", 2018, arXiv:1802.02271) investigate lossy compression of deep neural networks (DNNs) by weight quantization and lossless source coding for memory-efficient deployment, introducing "universal" DNN compression by universal randomized lattice quantization of DNNs, which randomizes DNN weights by uniform random dithering before lattice quantization and can perform near-optimally on any source without relying on knowledge of its probability distribution. The document cited presents a method of fine-tuning vector quantized DNNs to recover the performance loss after quantization.

BRIEF SUMMARY

The inventors have realized a solution such as as discussed in Choi et al., may exhibit various drawbacks such as:
reduction of accuracy of the CNN after quantization;
use of additional, possibly computationally burdensome, fine tuning processing of codewords to cope with such a reduction of accuracy; and
increased risk of CNN performance degradation.

Reducing power consumption and costs of CNNs (facilitating Internet-of-Things (IoT) applications which may be based on edge computing, for instance) is thus a goal worth pursuing.

Processing circuits configured to perform ANN processing, such as neural processing units (NPU), for instance, may comprise hardware accelerator engines including a compression/decompression functionality associated to weights, possibly reducing memory storage constraints of CNNs.

Related hardware implementations may suffer from drawbacks such as:
memory bottlenecks associated to fetching weights and activations; and/or
increased memory area costs.

An embodiment may facilitate addressing the drawbacks discussed in the foregoing.

One or more embodiments may relate to a corresponding computer program product.

To that effect, one or more embodiments may comprise a computer program product loadable in the memory of at least one processing circuit (e.g., a computer) and comprising software code portions for executing the steps of a method when the product is run on at least one processing circuit. As used herein, reference to such a computer program product is understood as being equivalent to reference to computer-readable medium containing instructions for controlling the processing system in order to co-ordinate implementation of the method according to one or more embodiments. Reference to "at least one computer" is intended to highlight the possibility for one or more embodiments to be implemented in modular and/or distributed form.

One or more embodiments may relate to a corresponding system (a HW accelerator system may be exemplary of such a system) having stored therein weights compressed with a method as exemplified herein.

One or more embodiments may relate to a corresponding method of decompressing such weights and a corresponding computer program product.

One or more embodiments may reduce computational burdens related to performing an inference forward pass in CNN processing.

One or more embodiments may thus facilitate avoiding having large parallel computing data-paths associated to operations executed frequently, such as 3D tensor convolutions which may result in a large number of multiply-add-accumulate operations, e.g., proportional to the number of coefficients (weights) of a certain neural network.

One or more embodiments may provide one or more of the following advantages:
compression of CNN weights is facilitated, thus reducing memory impact of CNN processing;
area for weight storage in embedded architectures is saved, thus reducing memory area costs which may be significant in advanced sub-nanometer silicon process technologies;

tailored optimization is facilitated in reducing the quantization error related to lattice vector quantization while maintaining the accuracy of the original network;

performance degradation related to memory bottlenecks associated to fetching weights and activations (in particular for large weights tensors, e.g., FC, LSTM/GRU layers) is effectively countered;

hardware complexity is reduced, which facilitates using a relatively simple de-compression circuit block, possibly leading to a more efficient design also for CNN acceleration frameworks and impact of computing on bandwidth usage is reduced.

In an embodiment, a computer-implemented method comprises: providing an artificial neural network, ANN, processing stage comprising a plurality of processing layers having respective processing layer parameters, the processing layer parameters including at least one set of weight parameters, at least one input activation parameter, at least one output activation parameter and at least one activation function parameter; setting a dimensional parameter of a lattice to an integer value, the lattice having a plurality of lattice points and identified by a set of basis vectors; selecting a set of weight parameters of a respective processing layer of the plurality of processing layers of the ANN processing stage; applying vectorization processing to the selected set of weight parameters producing a set of weight vectors as a result, and arranging the set of weight vectors as items of a matrix of weight vectors; performing normalization processing of the matrix of weight vectors, producing a matrix of normalized weight vectors as a result; applying lattice vector quantization, LVQ, processing to the matrix of normalized weight vectors, producing a codebook of codewords as a result; applying indexing processing to the produced codebook, the indexing comprising encoding codewords of the codebook as a function of the lattice L, producing respective tuples of indices as a result; and providing the produced tuples of indices to a user circuit, wherein performing the normalization processing of the matrix of weight vectors comprises computing an optimization problem having: a first term configured to provide normalized weight values which approximate the at least output activation parameter of the ANN processing stage as a function of the at least one input activation parameter of the ANN processing stage; and a regularization term $\Omega_L$ configured to amplify normalized weight values having a short distance from the lattice points of the selected lattice.

In an embodiment, a method, comprises: implementing an artificial neural network (ANN) having a plurality of processing layers with respective processing layer parameters, the processing layer parameters including at least one set of weight parameters $(w_i)$, at least one input activation parameter $(a_j)$, at least one output activation parameter $(b_j)$ and at least one activation function parameter $(\rho)$; setting a dimensional parameter $(d)$ of a lattice to an integer value, the lattice having a plurality of lattice points and identified by a set of basis vectors $(b_1, b_2)$; selecting a set of weight parameters $(w_i)$ of a respective processing layer of the plurality of processing layers of the ANN; applying vectorization processing to the selected set of weight parameters $(w_i)$, producing a set of weight vectors $(u_1, u_2, u_3)$, and arranging the set of weight vectors $(u_1, u_2, u_3)$ as a matrix of weight vectors (U); performing normalization processing of the matrix of weight vectors (U), producing a matrix of normalized weight vectors (U'); applying lattice vector quantization (LVQ) processing to the matrix of normalized weight vectors (U'), producing a codebook of codewords; applying indexing processing to the produced codebook, the indexing comprising encoding codewords of the codebook as a function of the lattice, producing respective tuples of indices $(i_s, i_a, i_a^{LUT})$; and providing the produced tuples of indices $(i_s, i_a, i_a^{LUT})$ to a neural processing circuit of the ANN, wherein performing the normalization processing of the matrix of weight vectors (U) comprises solving an optimization problem having: a first term to provide normalized weight values which approximate the at least one output activation parameter $(b_j)$ of the ANN as a function of the at least one input activation parameter $(a_j)$ of the ANN; and a regularization term $\Omega_L(u)$ to amplify normalized weight values distanced from the lattice points of the selected lattice.

In an embodiment, a non-transitory computer-readable medium's contents configured a computing system to perform a method, the method comprising: implementing an artificial neural network (ANN) having a plurality of processing layers with respective processing layer parameters, the processing layer parameters including at least one set of weight parameters $(w_i)$, at least one input activation parameter $(a_j)$, at least one output activation parameter $(b_j)$ and at least one activation function parameter $(\rho)$; setting a dimensional parameter $(d)$ of a lattice to an integer value, the lattice having a plurality of lattice points and identified by a set of basis vectors $(b_1, b_2)$; selecting a set of weight parameters $(w_i)$ of a respective processing layer of the plurality of processing layers of the ANN; applying vectorization processing to the selected set of weight parameters $(w_i)$, producing a set of weight vectors $(u_1, u_2, u_3)$, and arranging the set of weight vectors $(u_1, u_2, u_3)$ as a matrix of weight vectors (U); performing normalization processing of the matrix of weight vectors (U), producing a matrix of normalized weight vectors (U'); applying lattice vector quantization (LVQ) processing to the matrix of normalized weight vectors (U'), producing a codebook of codewords; applying indexing processing to the produced codebook, the indexing comprising encoding codewords of the codebook as a function of the lattice, producing respective tuples of indices $(i_s, i_a, i_a^{LUT})$; and providing the produced tuples of indices $(i_s, i_a, i_a^{LUT})$ to a neural processing circuit of the ANN, wherein performing the normalization processing of the matrix of weight vectors (U) comprises solving an optimization problem having: a first term to provide normalized weight values which approximate the at least one output activation parameter $(b_j)$ of the ANN as a function of the at least one input activation parameter $(a_j)$ of the ANN; and a regularization term $\Omega_L(u)$ to amplify normalized weight values distanced from the lattice points of the selected lattice.

In an embodiment, a device comprises: a memory; and processing circuitry coupled to the memory, wherein the processing circuitry, in operation: sets a dimensional parameter $(d)$ of a lattice to an integer value, the lattice having a plurality of lattice points and identified by a set of basis vectors $(b_1, b_2)$; selects a set of weight parameters $(w_i)$ of a respective processing layer of a plurality of processing layers of an artificial neural network (ANN), the ANN having a plurality of processing layers with respective processing layer parameters, the processing layer parameters including at least one set of weight parameters $(w_i)$, at least one input activation parameter $(a_j)$, at least one output activation parameter $(b_j)$ and at least one activation function parameter $(\rho)$; applies vectorization processing to the selected set of weight parameters $(w_i)$, producing a set of weight vectors $(u_1, u_2, u_3)$, and arranging the set of weight vectors $(u_1, u_2, u_3)$ as a matrix of weight vectors (U); performs normalization processing of the matrix of weight vectors (U), producing a matrix of normalized weight vectors (U'); applies lattice vector quantization (LVQ) processing to the matrix of normalized weight vectors (U'), producing a codebook of codewords; and indexes the produced codebook, the indexing comprising encoding codewords of the codebook as a function of the lattice, producing respective tuples of indices ($i_s$, $i_a$, $i_a^{LUT}$), wherein performing the normalization processing of the matrix of weight vectors (U) comprises solving an optimization problem having: a first term to provide normalized weight values which approximate the at least one output activation parameter ($b_j$) of the ANN as a function of the at least one input activation parameter ($a_j$) of the ANN; and a regularization term $\Omega_L(u)$ to amplify normalized weight values distanced from the lattice points of the selected lattice.

In an embodiment, a system, comprises: a memory, which, in operation, stores compressed normalized weight values; a processing core; and a hardware accelerator engine coupled to the memory and the processing core, wherein the hardware accelerator engine, in operation: decompresses stored normalized weight values, producing decompressed weight values, and performs an operation of an artificial neural network (ANN) as a function of said decompressed weight values, wherein the stored compressed normalized weight values correspond to a solution to an optimization problem having: a first term to provide normalized weight values which approximate at least one output activation parameter ($b_j$) of the ANN as a function of at least one input activation parameter ($a_j$) of the ANN; and a regularization term $\Omega_L(u)$ to amplify normalized weight values distanced from the lattice points of the selected lattice.

BRIEF DESCRIPTION OF THE SEVERAL VIEWS OF THE DRAWINGS

One or more embodiments will now be described, by way of non-limiting example only, with reference to the annexed Figures, wherein.

DETAILED DESCRIPTION

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment.

Moreover, particular conformations, structures, or characteristics may be combined in any adequate way in one or more embodiments.

The headings/references used herein are provided merely for convenience and hence do not define the extent of protection or the scope of the embodiments.

Throughout the figures annexed herein, like parts or elements are indicated with like references/numerals; for brevity a corresponding description will not be repeated for each and every figure.

Also, throughout this description, the wording "neural network (processing)" as used, for instance, in expressions like artificial neural network (ANN) processing or convolutional neural network (CNN) processing, is intended to designate machine-implemented processing of signals performed via hardware (HW) and/or software (SW) tools.

Figure 1:
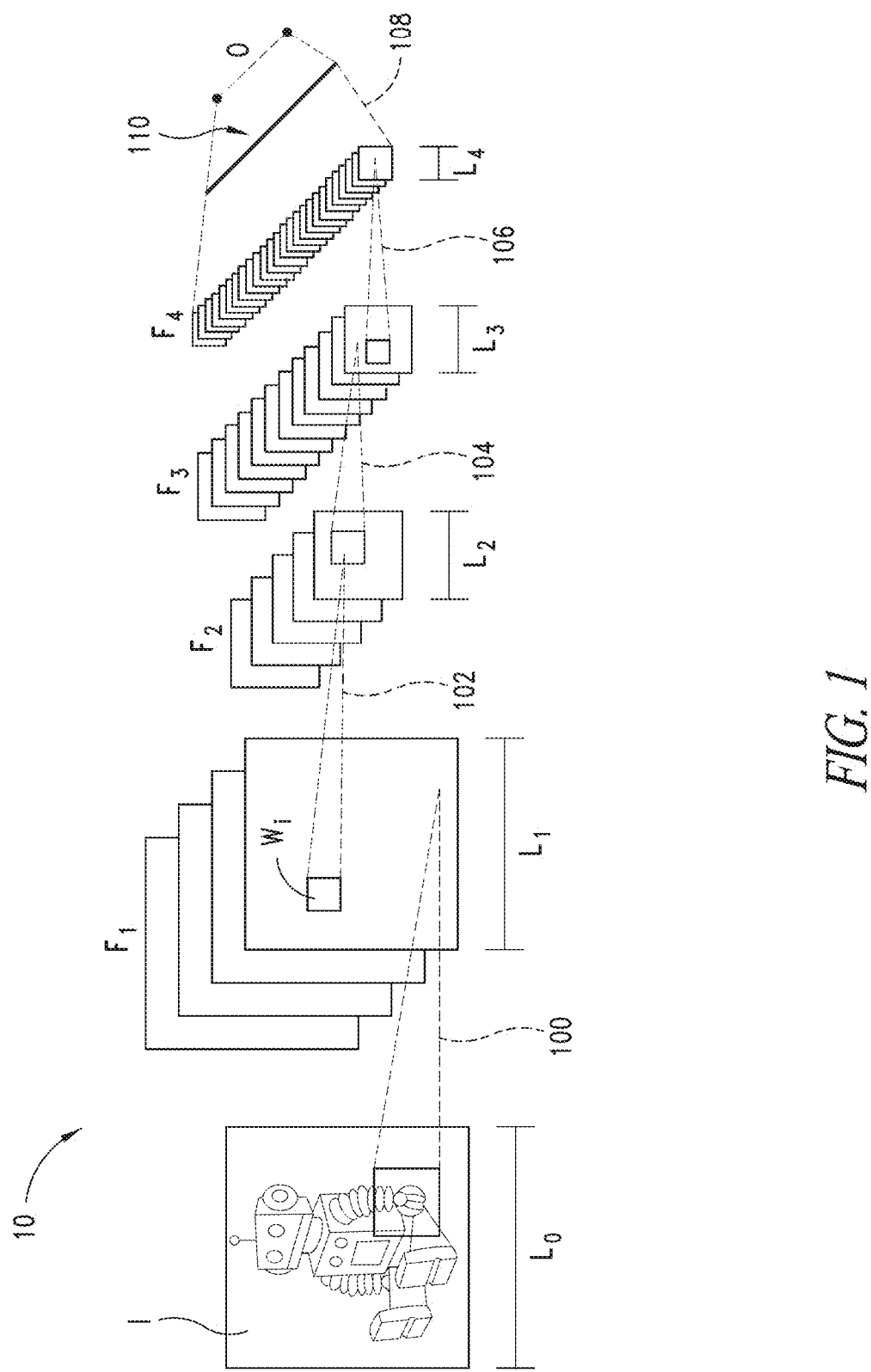
FIG. 1 is a diagram of an exemplary convolutional neural network, CNN, processing stage.

In addition to an input layer, configured to receive an input image tensor I with a certain size, for instance an image tensor I having a size given by the image width L times an image height (e.g., equal to the image width L) times an image depth (e.g., 1) times a number of images in the tensor I (e.g., 1), a convolutional neural network (CNN) 10 as illustrated in FIG. 1 may comprise a plurality of processing layers 100, 102, 104, 106, 108, 110 comprising:

a plurality of (hidden) processing layers 100, 102, 104, 106, 108 coupled to the input layer and configured to apply to an image tensor O received therefrom, data processing such as convolutional and/or pooling processing, for instance; and an output layer 110 coupled to the input layer via the hidden layers 100, 102, 104, 106, 108, the output layer 110 comprising a fully connected layer, for instance.

As illustrated, the processing layers 100, 102, 104, 106, 108, may be configured to produce respective feature maps F1, F2, F3, F4. Each such feature map may have a size given by a feature map width L1, L2, L3, L4 times a feature map height (which may be equal to the width L1, L2, L3, L4) times feature map channels (e.g., three channels for a RGB image having red, green and blue colors), times a number of maps.

In one or more embodiments, the processing layers 100, 102, 104, 106, 108 may have a multi-layer perceptron (briefly, MLP) architecture, comprising a plurality of processing units indicated as perceptrons.

A single i-th perceptron in the plurality of perceptrons may be identified by a tuple of values comprising weight values $w_i$, offset values $b_i$ and an activation function $\rho_i$.

As exemplified in FIG. 1, a convolutional processing layer, such as the one referenced as 102 (taken as an example of the various layers), comprises at least one convolution kernel (matrix) $w_i$ having a size which may be expressed as:

$$w_i \in R^{C \times H \times T} \quad i=1, \ldots K$$

where
H represents kernel height,
T represents kernel width,
K represents number of kernels, e.g., K=1, and C represents a number of input channels, which may be equal to a number of (image color) channels of the input feature map F1.

The output layer 110 may comprise a fully connected layer, that is a type of convolutional layer having connections to all activations in the previous layer.

A convolutional layer such as 102 (again taken as a possible example) may be configured to apply an activation function to a sliding dot product.

Such an operation may be expressed as, for instance:

$$b = \rho(w_i^T \cdot a)$$

where $w_i^T$ is a transposed version of the weight vector $w_i$ (corresponding to the kernel), a is the input feature vector, e.g., computed by the processing layer 100 preceding the considered one 102, $\rho$ is the activation function of the layer 102, and b is the output resulting from applying the activation function $\rho$ to the product of the kernel and the input feature vector.

Figure 2:
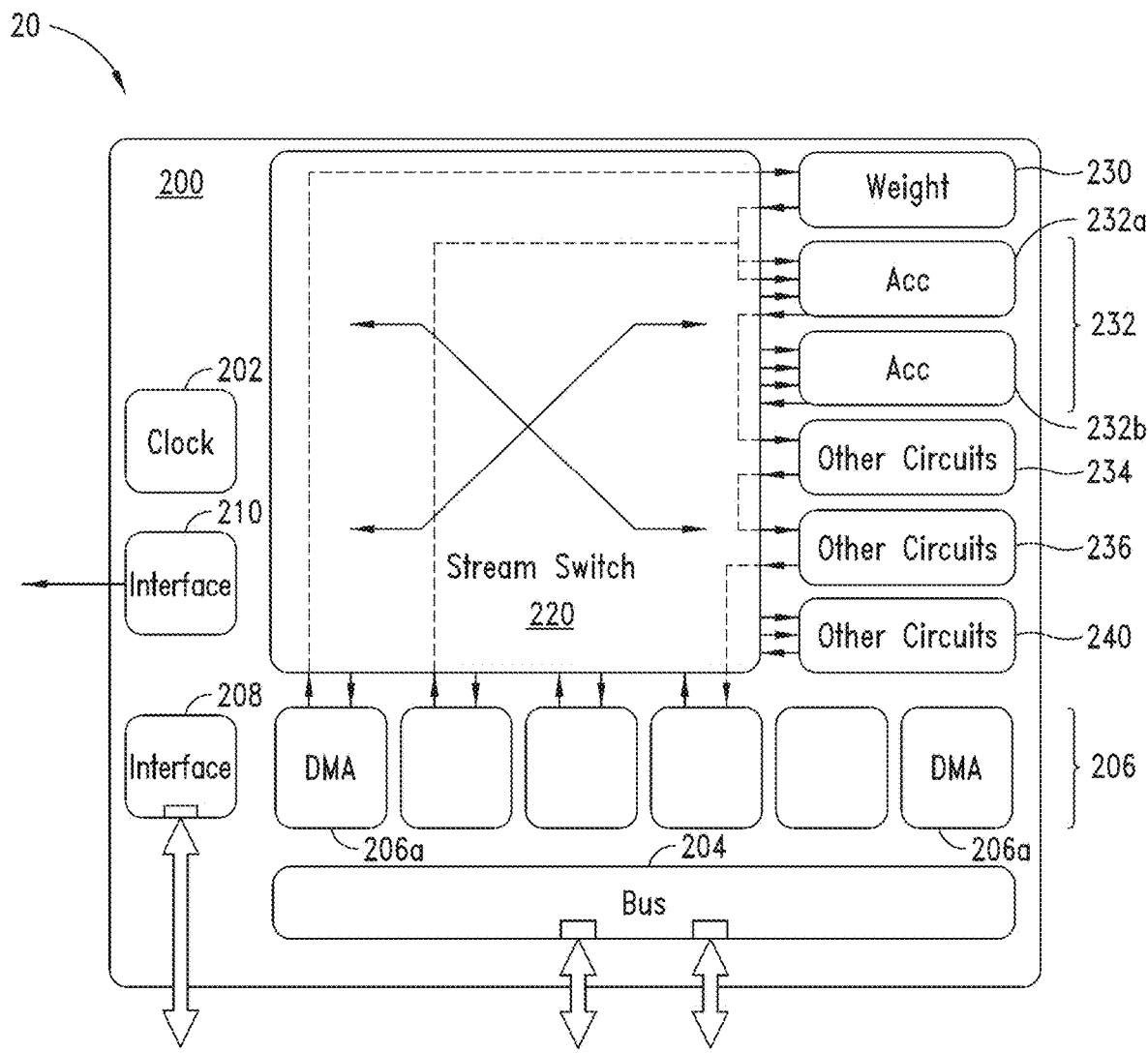
FIG. 2 is a diagram of an exemplary hardware accelerator engine.

As exemplified in FIG. 2, a neural processing unit or circuit (NPU) 20 may comprise processing circuitry configured to perform CNN processing.

Document EP 3 346 425 A1 discusses an NPU circuit suitable for use in accelerating CNN processing, for instance.

As exemplified in FIG. 2, such a NPU circuit 20 comprises:

a system on chip board 200 configured to host processing circuitry;

a clock signal provider block or circuit 202;

direct memory access (DMA) units or circuits 206, 206a, for accessing a memory circuit block, e.g., via a bus interface 204, in ways per se known;

a plurality of input/output interfaces 208, 210;

a stream switch circuit block 220, configured to manage data traffic among different elements of the board;

a weight encoding/decoding circuit block 230, configured to process weight values from memory, e.g., retrieved by the DMAs 206 and passed by the stream switch 220;

a set of configuration accelerator circuits 232, 232a, 232b; and a set of further processing circuit blocks 234, 236, 240, for instance for pooling, activation, miscellaneous functions.

In particular, weight values may be decoded starting from encoded weight values which may be encoded (or compressed) to reduce the memory footprint of running the CNN on the NPU 20.

For instance, weight values may be encoded by applying quantization processing thereto.

Vector quantization techniques may be found suitable to perform such a quantization processing. For instance, a d-dimensional vector may be mapped to a finite set of vectors $C=\{c_i: i=1, 2, \ldots, N\}$, where each vector $c_i$ may be indicated as a "codeword". The set of all the codewords may be indicated as "codebook". Each codeword may be associated to a nearest neighbor region indicated as "Voronoi region".

In lattice vector quantization (briefly, LVQ), the codebook may comprise points of a lattice, with centroids of the Voronoi regions used as approximating vectors.

As discussed herein, a lattice L of dimension d is a set of all integer linear combinations of basis vectors $b_1, \ldots, b_d$ in the d-dimensional Euclidean space, which may be expressed as:

$$L(b_1, \ldots, b_d) = \{\Sigma x_i b_i | x_i \in Z\}, b_i \in R^d$$

Figure 3A:
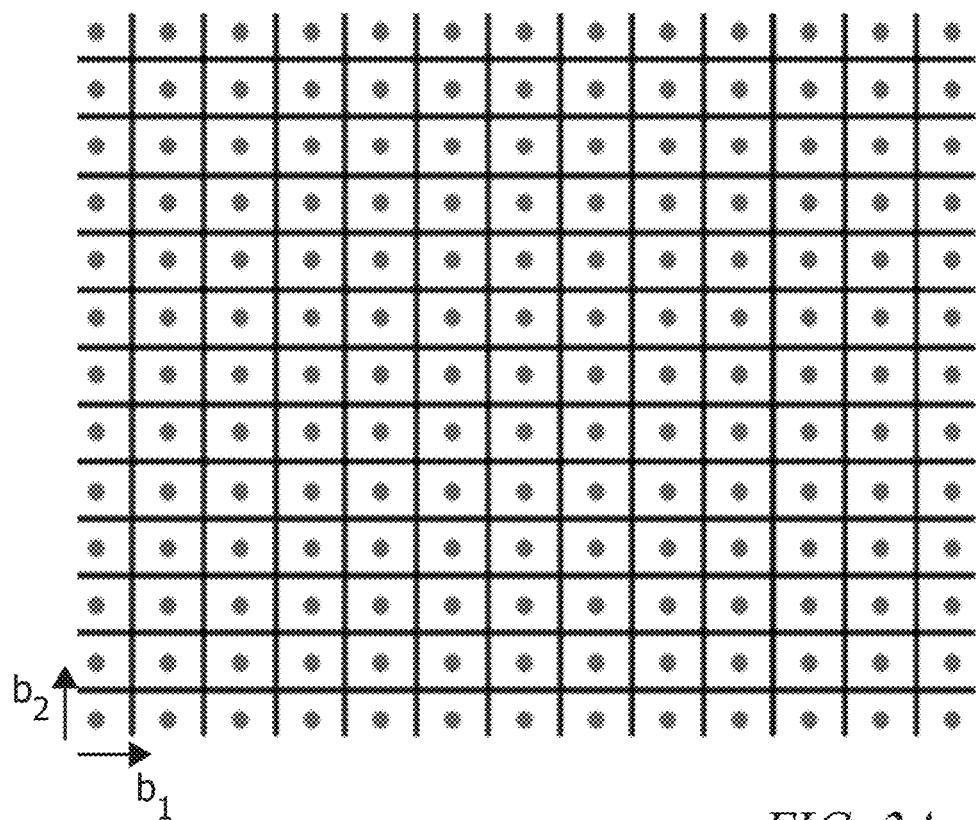
FIGS. 3A and 3B are diagrams exemplary of principles underlying one or more embodiments.
Figure 3B:
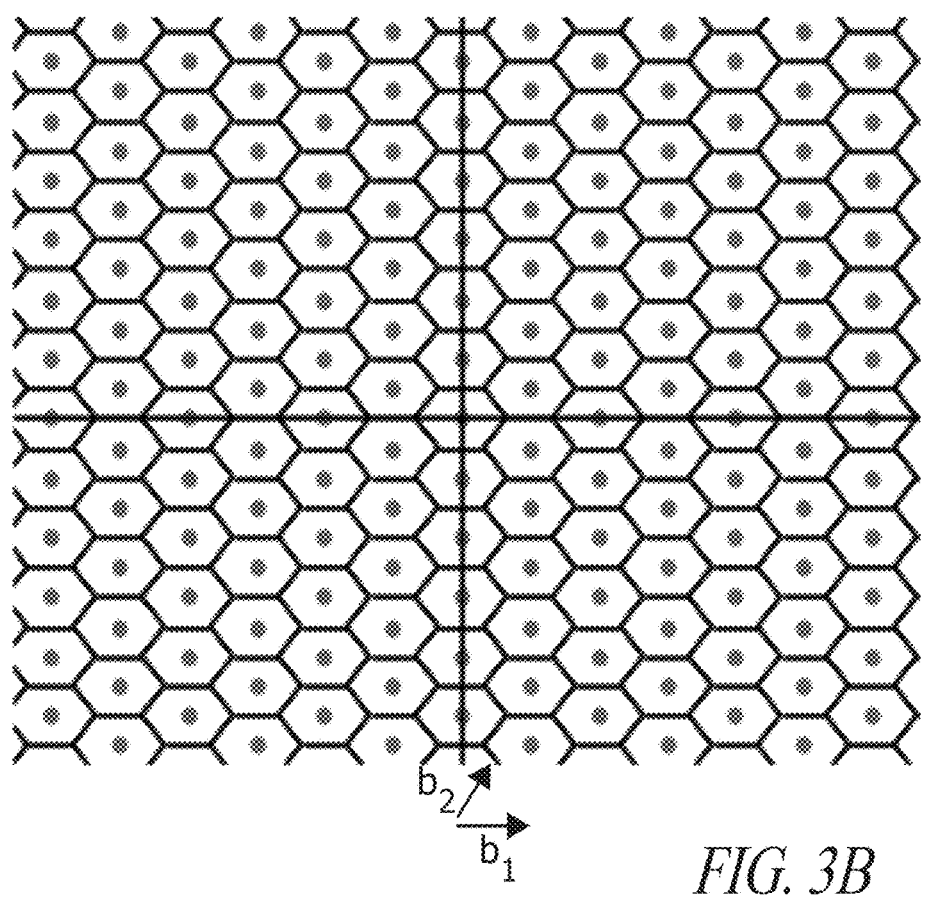

As exemplified in FIGS. 3A and 3B, for instance:

a first bidimensional (d=2) lattice, has a first pair of basis vectors b1, b2 which may be expressed as: $b_1=[1,0]$; $b_2=[0; 1]$ in Cartesian coordinates; and a second bidimensional (d=2) lattice, e.g., a hexagonal lattice, has a second pair of basis vectors b1, b2 which may be expressed as:

$$b_1 = \left[\frac{\sqrt{3}}{2}, \frac{1}{2}\right];$$

$b_2=[0;1]$ in Cartesian coordinates.

In comparison other vector quantization techniques, LVQ may exhibit advantages such as:

use of a fixed codebook, as lattice points are determined by the choice of the lattice basis; and fast quantization and indexing insofar as a lattice structure facilitates keeping organized lattice points.

For the sake of simplicity, one or more embodiments are discussed in the foregoing with respect to a trained CNN having set weight values (e.g., set based on the training), being otherwise understood that such a scenario is purely exemplary and in no way limiting.

Figure 4:
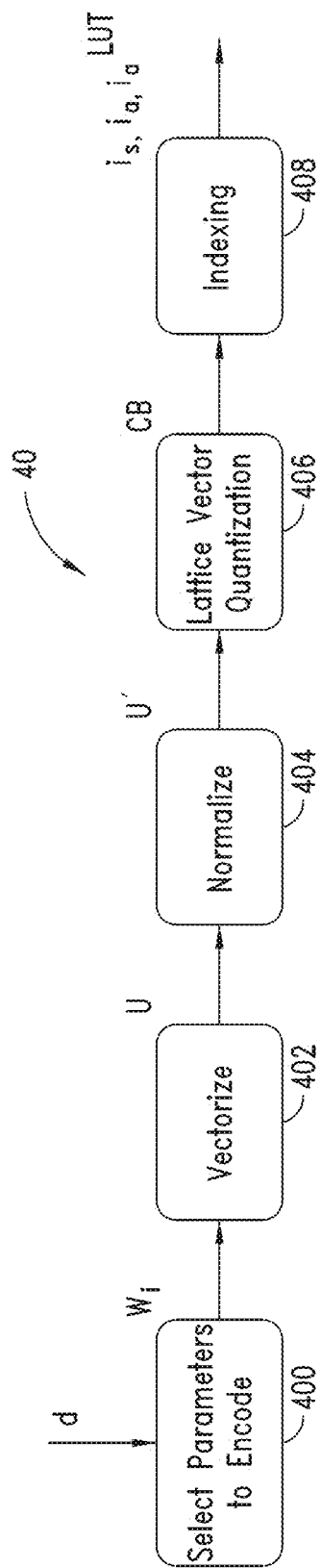
FIG. 4 is a flow chart exemplary of a method as per the present disclosure.

As exemplified in FIG. 4, a method 40 to compress weight values, may comprise:

selecting (block 400) among CNN parameters a set of parameters to be encoded; this may involve selecting a type of processing layer, e.g., convolutional or fully connected, and/or a dimensional parameter value d for the lattice to use, e.g., an integer, even value such as d=2 or d=4, for instance;

performing vectorization of weight values (block 402), that is storing weight values as vector elements, wherein such a vectorization may comprise receiving a matrix of weight values and applying data transformation processing thereto, producing a set of weight vectors as a result, as discussed in the following;

applying normalization processing (block 404) to the produced set of weight vectors, such a normalization comprising solving an optimization problem, as discussed in the following;

performing lattice vector quantization, LVQ (block 406) using the selected (integer) dimensional parameter value d to select a lattice for quantization, producing a codebook of codewords as a result; and indexing (block 408) codewords produced by applying LVQ, the indexing comprising encoding an i-th element of the selected lattice using a tuple of indices $i_s$, $i_a$, $i_a^{LUT}$)).

For the sake of simplicity, embodiments are mainly discussed herein with respect to a bidimensional lattice, (e.g., d=2), being otherwise understood that such a lattice dimension is purely exemplary and in no way limiting.

It is noted that in one or more embodiments it may be advantageous to select a value of the dimensional parameter d which is an integer multiple or divisor of the size of the kernels, as this may facilitate vectorization 402 of weight values, as discussed in the following.

As exemplified in FIGS. 5A to 5D, a matrix of weight values $w_i$ of a convolutional layer, for instance that indicated by 102 in FIG. 1, may be represented as a multi-dimensional grid $w_i$ whose elements are the weight values, the grid $w_i$ having a grid height H, a grid width T, a number of channels C and a number of kernels K. Any element of the multi-dimensional grid $w_i$ may be identified, for instance, by a set of indexes, one for each dimension, e.g., $w_i^{jlmn}$ For the sake of simplicity, FIGS. 5A to 5D refer to an exemplary case where the matrix has a same height, width and number of channels, e.g., H=C=T=3, being otherwise understood that such exemplary values are purely exemplary and in no way limiting.

FIGS. 5A to 5D are diagrams exemplary of performing vectorization of weight values 402, which may comprise:
- selecting an order of matrix dimensions along which processing elements of the matrix $w_i$, e.g., first the channel dimension C followed by width T, for instance associating each index of the element to a dimension, e.g., associating index j to the channel dimension C, index l to the width dimension T, index m to the height dimension H and index k to the number of kernel K;
- extracting weight elements of the matrix $w_i$ as elements of respective vectors u1, u2, u3 along the selected dimension, producing a set of vectors u1, u2, u3 as a result, the vectors having a size d equal to the selected dimensional parameter value, e.g., an even value d=2 in the example considered; and
- re-arranging the set of vectors u1, u2, u3 produced for instance item-wise stacking the produced set of vectors, producing a matrix U having weight vectors u1, u2, u3 stacked item-wise, e.g., column-wise.

Figure 5A:
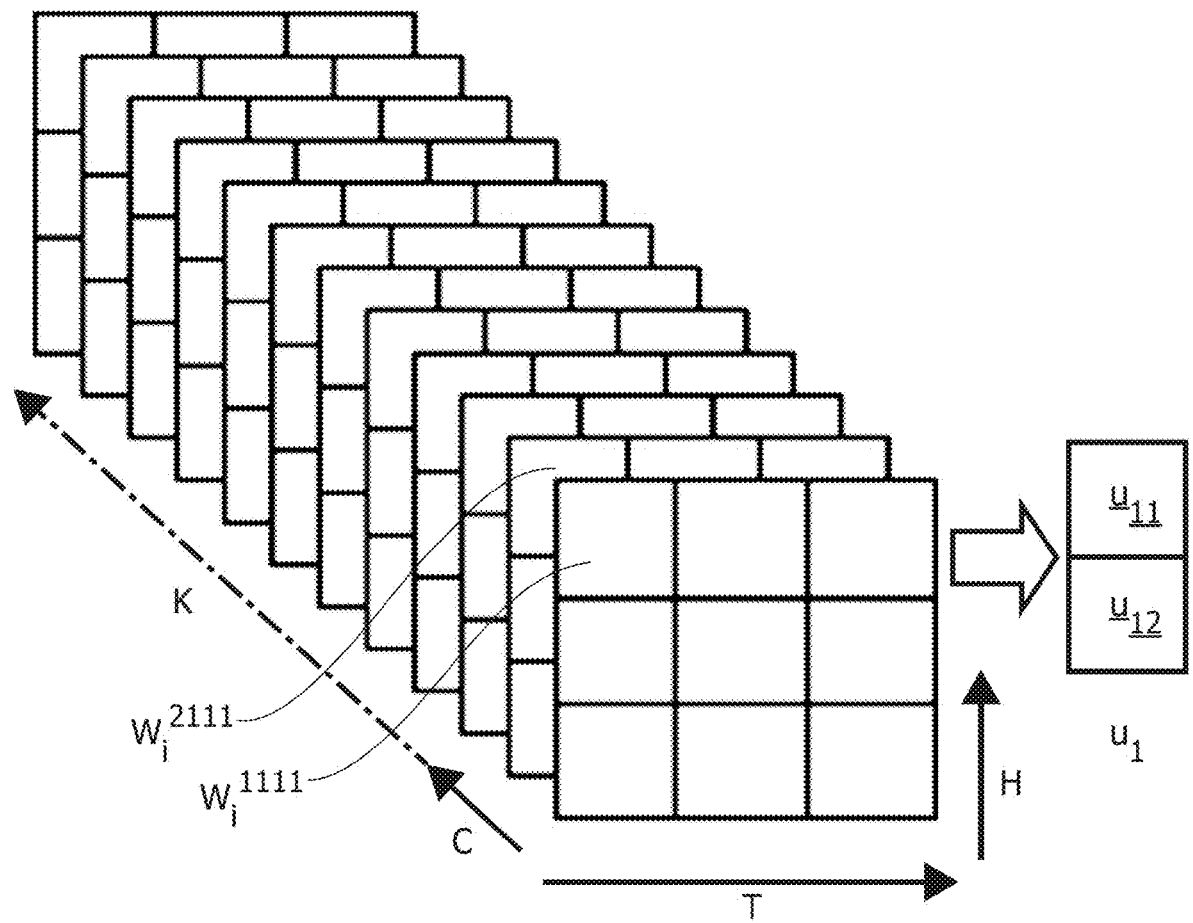
FIGS. 5A, 5B and 5C are diagrams exemplary of principles underlying one or more embodiments.
Figure 5B:
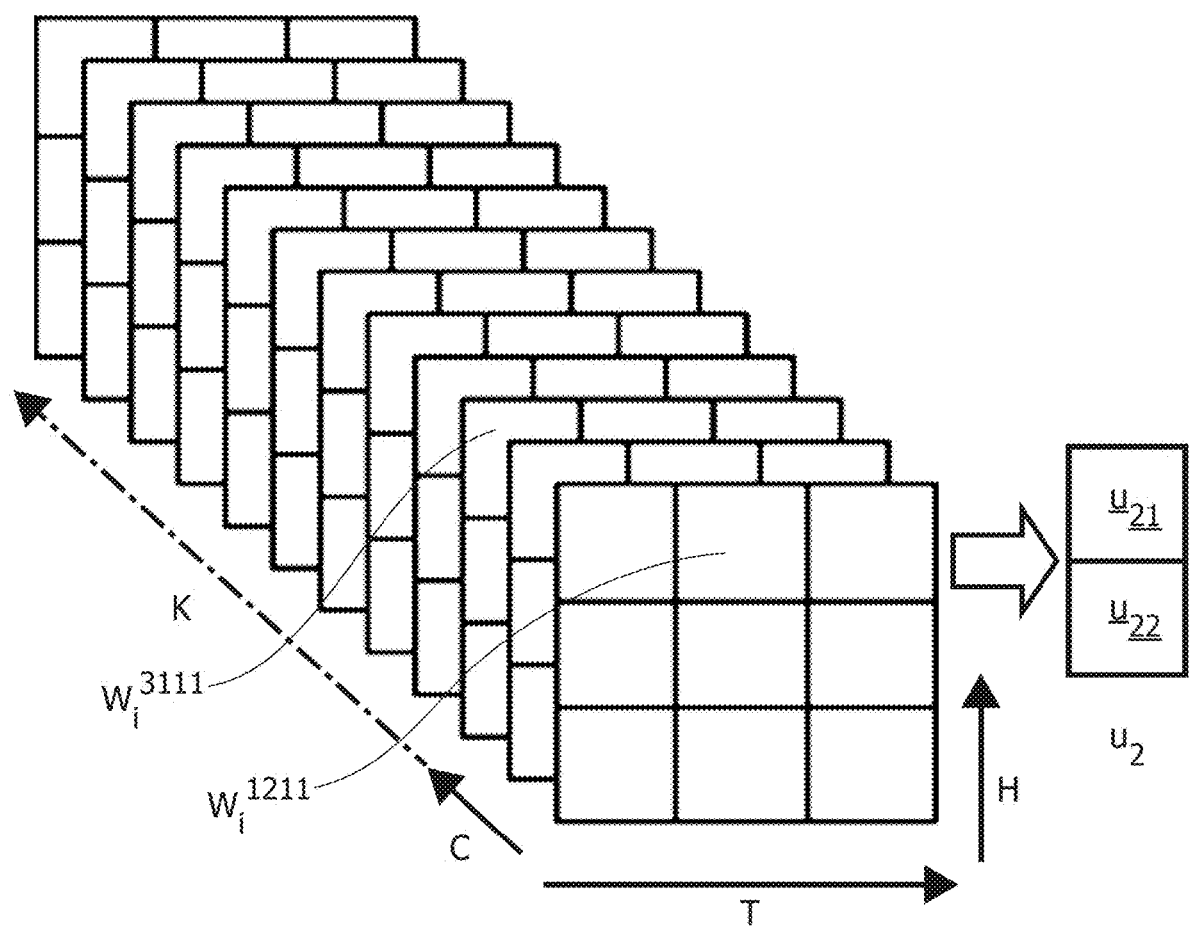
Figure 5C:
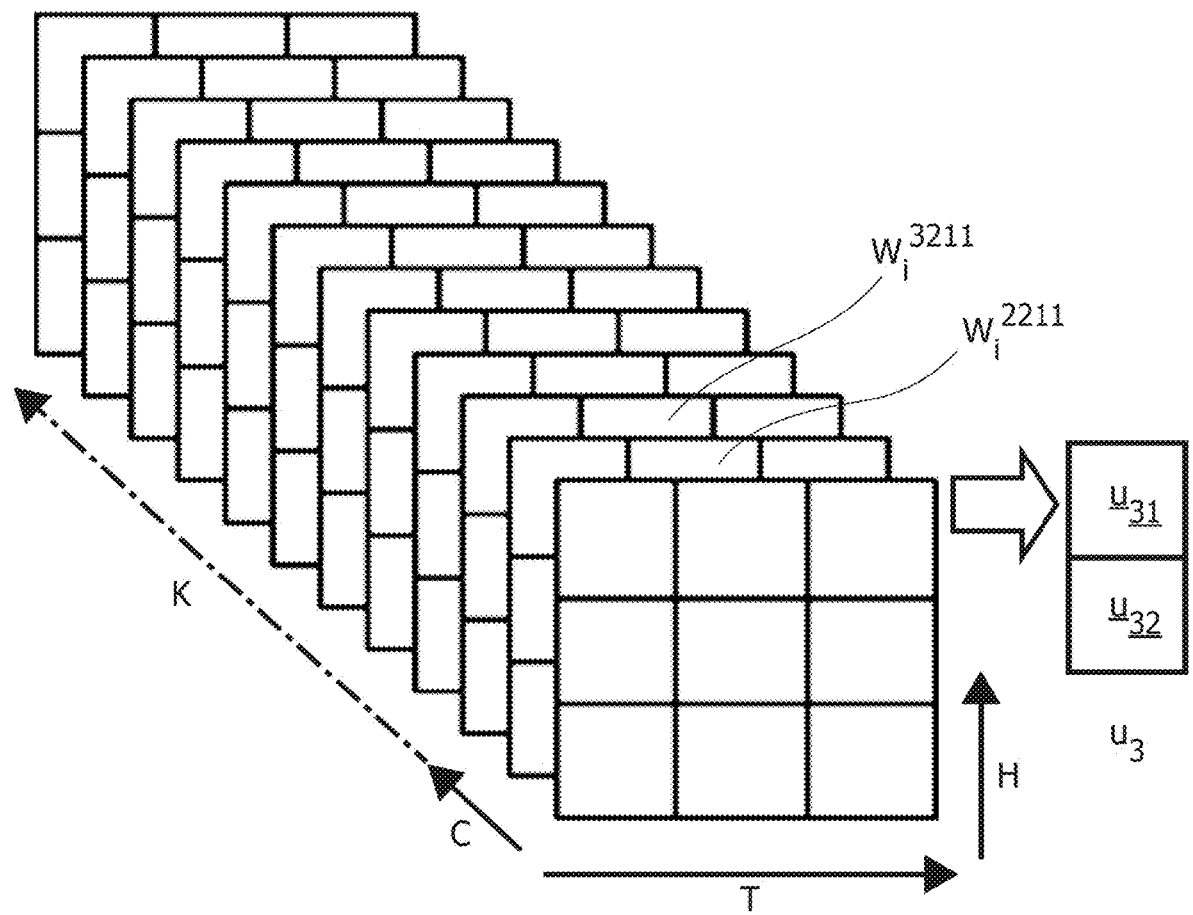

Re-arranging weight elements of the matrix/grid of weights $w_i$ as exemplified in FIGS. 5A to 5D may comprise:
- as exemplified in FIG. 5A, extracting a first set of weight values $u_{11}$, $u_{12}$ from the grid $w_i$ and rearranging such a first set of values $u_{11}$, $u_{12}$ in a first vector u1, e.g., $u_1=(u_{11}, u_{12})$, where the first set of weight values $u_{11}$, $u_{12}$ comprises a first weight value $u_{11}$ corresponding to an element of the grid $w_i$ having a first set of index values, e.g., $u_{11}=w_i^{1111}$, and a second weight value $u_{12}$ corresponding to an element of the grid $w_i$ having a second set of index values with the index j of the channel dimension C incremented by one with respect to the first set of index value, e.g., $u_{12}=w_i^{2111}$;
- as exemplified in FIG. 5B, extracting a second set of weight values $u_{21}$, $u_{22}$ from the grid of weights $w_i$, and rearranging such a second set of values $u_{21}$, $u_{22}$ in a second vector u2, e.g., $u_2=(u_{21}, u_{22})$, where the second set of weight values $u_{21}$, $u_{22}$ comprises a third weight value $u_{21}$ corresponding to an element of the grid $w_i$ having a third set of index values with the index j of the channel dimension C incremented by one with respect to that of the second weight value $u_{12}$, e.g., $u_{21}=w_i^{3111}$ and a fourth weight value $u_{22}$ corresponding to an element of the grid $w_i$ having a fourth set of index values with the index j of the channel dimension reset to 1 due to reaching its maximum and the index l of the width dimension incremented by one with respect to that of the third weight value $u_{21}$, e.g., $u_{22}=w_i^{1211}$;
- as exemplified in FIG. 5C, extracting a third set of weight values $u_{21}$, $u_{22}$ from the grid of weights $w_i$, and rearranging such a third set of values $u_{31}$, $u_{32}$ in a second vector u2, e.g., $u_3=(u_{31}, u_{32})$, where the third set of weight values $u_{31}$, $u_{32}$ comprises a fifth weight value $u_{31}$ corresponding to an element of the grid $w_i$ having a fifth set of index values with the index j of the channel dimension C incremented by one with respect to that of the fourth weight value $u_{12}$, e.g., $u_{31}=w_i^{2211}$, and a sixth weight value $u_{32}$ corresponding to an element of the grid $w_i$ having a sixth set of index values with the index j of the channel dimension C incremented by one with respect to that of the fifth weight value $u_{31}$, e.g., $u_{32}=w_i^{3211}$.

In the example considered, re-arranging the produced set of vectors u1, u2, u3 may produce the matrix U having the first vector u1, second vector u2 and third vector u3 as respective first, second and third columns, which may be expressed as:

$$U = [u1 \; u2 \; u3] = \begin{bmatrix} u_{11} & u_{12} & u_{31} \\ u_{21} & u_{22} & u_{32} \end{bmatrix}$$

A way of collecting values from the grid elements as exemplified in FIGS. 5A to 5C may be substantially follow a "boustrophedon" path along a certain dimension, e.g., the channel dimension C, collecting weight values while "plowing" in the grid and rearranging them in vectors whenever a number of "plows" equal to selected dimensional parameter d has been reached.

In one or more embodiments, the matrix U produced as a result of rearranging weight values 402 may be used in applying normalization processing 404, which may comprise using stochastic gradient descent (SGD) to solve an optimization problem which may be expressed as:

$$\min_U \sum_{s_j \in S} \|\rho(U^T a_j) - b_j\|_2^2 + \lambda \sum_{u_k \in U} \Omega_L(u_k)$$

where
S denotes the set of all the training samples,
$a_j$ and $b_j$ are respectively the input and output activations of the selected layer, e.g., the layer indicated by 102 in FIG. 1,
$\rho$ is the activation function (e.g., a ReLU), and
$\Omega_L$ is a regularization term calculated as a function of values of the matrix U produced as a result of rearranging weight values 402.

Specifically, the regularization term $\Omega_L(u)$ may be expressed as:

$$\Omega_L(u) = -\sum_{c \in L} e^{-\frac{\|u-cw\|_2^2}{2\sigma^2}}$$

where
$\sigma^2$ is a statistical variance, whose value may be set by the user, and
cw is a codeword vector of the lattice L used in the LVQ processing 406.

Such a regularization term $\Omega_L(u)$ is designed to reach a minimum value if the k-th column $u_k$ of the matrix U is also a codeword of the lattice L.

The choice of the aforementioned optimization problem to solve may be based on the following rationale:
- the first term of the problem, expressed as $\Sigma_{s_j \in S} \|\rho(U^T a_j) - b_j\|_2^2$ facilitates producing values which may adequately approximate output activations of the CNN, given the same input activations; and
- the regularization term $\Omega_L(u)$ may facilitate weights which are closer, having a reduced distance from, to the (Voronoi region centroid) points of the chosen lattice L.

Figure 6A:
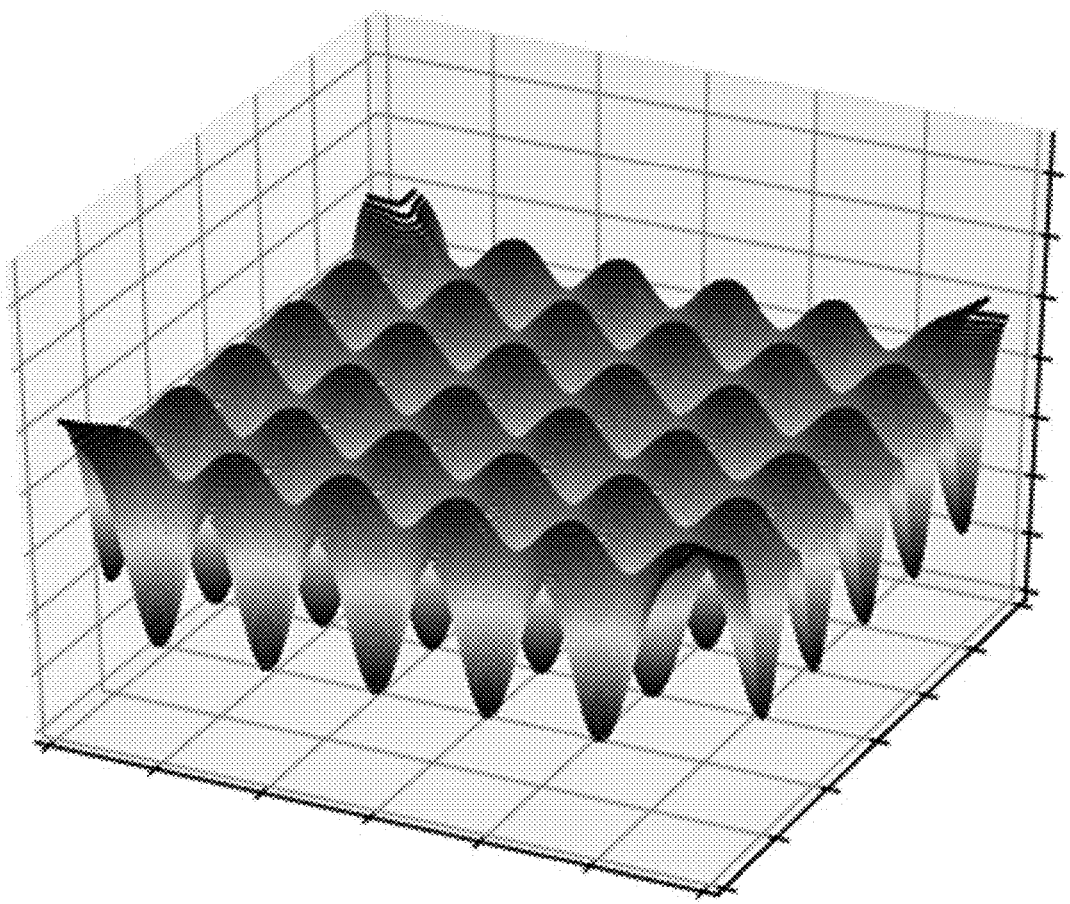
FIGS. 6A and 6B are plots exemplary of a function suitable for performing a portion of the method of FIG. 4.

FIG. 6A is a plot exemplary of the function $\Omega_L(u)$ in a tridimensional Cartesian space.

Figure 6B:
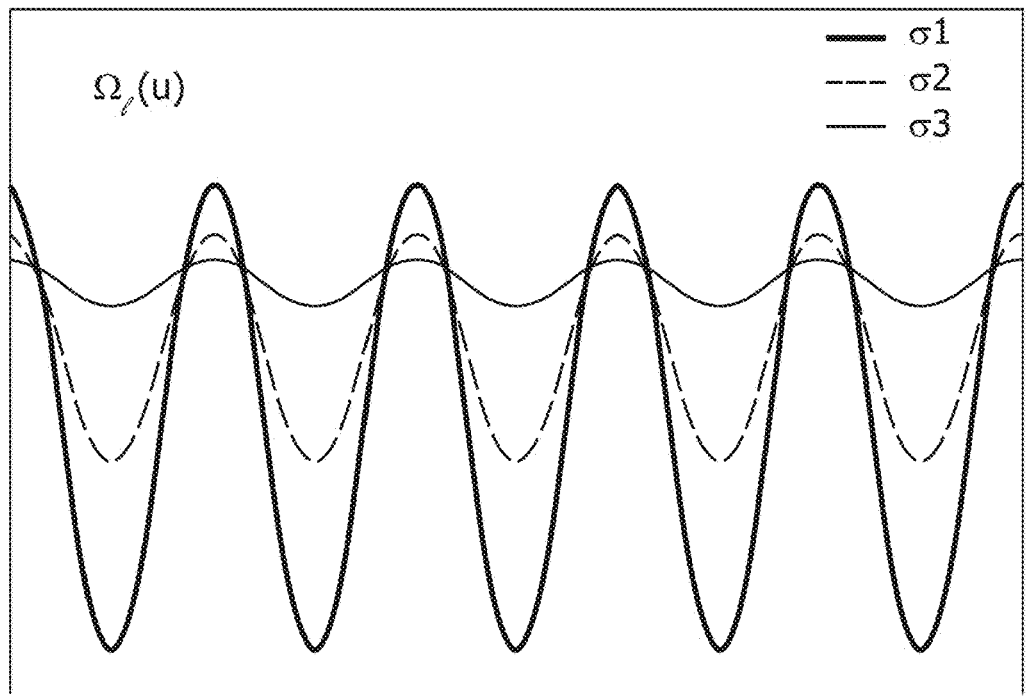

FIG. 6B is a projection of the previous plot, $\Omega_l(u)$ for different variance values $\sigma_1$, $\sigma_2$, $\sigma_3$, e.g., $\sigma_1=0.25$, $\sigma_2=0.3$, $\sigma_3=0.4$.

Optionally, when computing the regularization term $\Omega_L(u)$, a further scaling factor $\lambda_k$ may be applied to the matrix U, so as to improve matching the weight vectors to the selected lattice L.

Figure 7A:
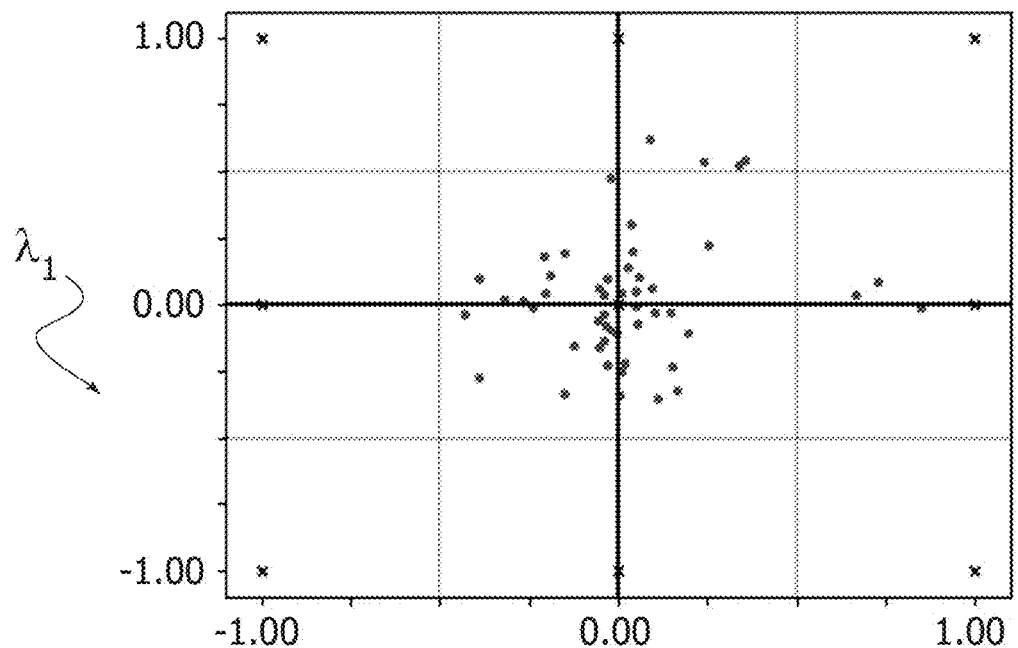
FIGS. 7A to 7C are diagrams exemplary of principles underlying lattice optional features.
Figure 7B:
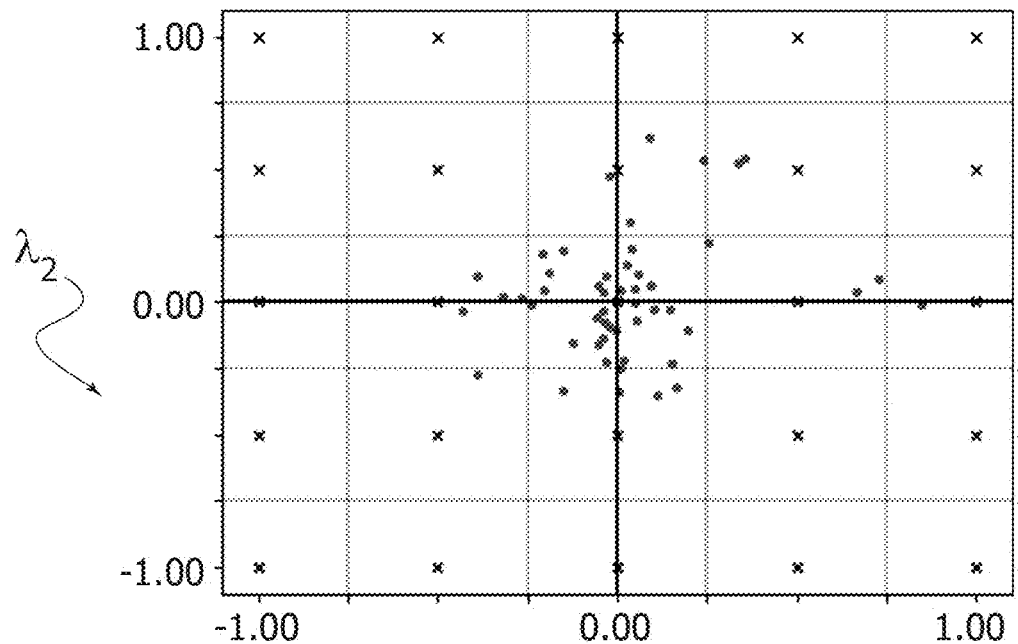
Figure 7C:
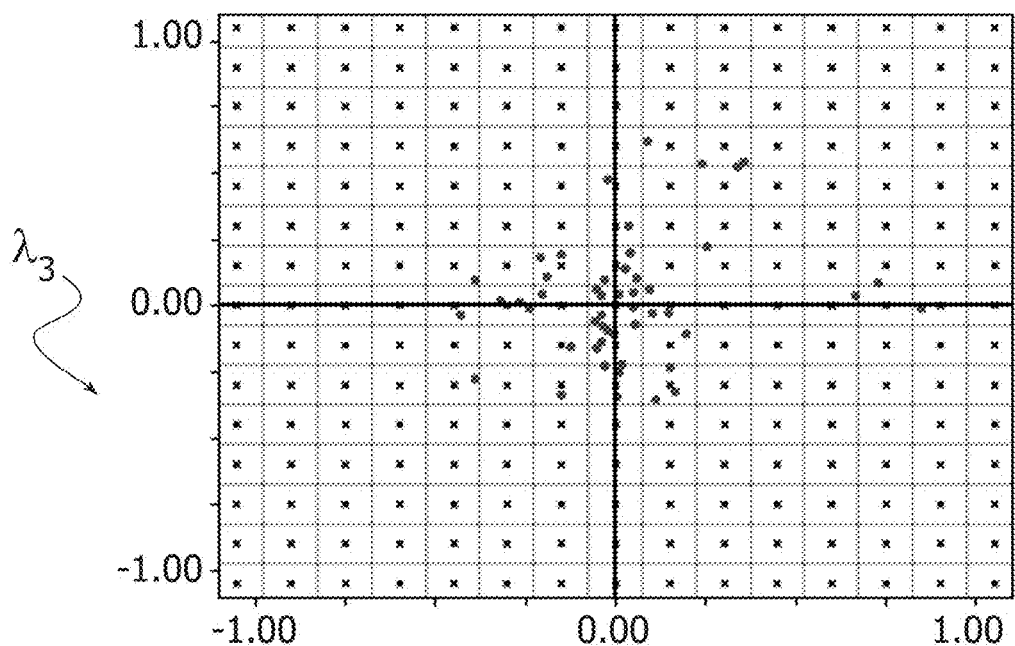

FIGS. 7A to 7C are diagrams showing possible different distributions of the elements of the matrix U (represented by filled circle points in the diagrams), when different scaling factors $\lambda 1$, $\lambda 2$, $\lambda 3$ are applied thereto with respect to a bidimensional (d=2) lattice L having basis vectors b1, b2 which may be expressed as: $b_1=[1,0]$; $b_2=[0; 1]$ in Cartesian coordinates (Voronoi region centroids of the lattice L are represented by cross points in the diagrams), e.g., $\lambda 1=1$, $\lambda 2=0.5$, $\lambda 3=0.15$.

In one or more embodiments, decreasing the value of the scaling factor $\lambda$ may increase a density of the distribution of elements of the matrix U with respect to the selected lattice L.

As exemplified herein, solving the normalization problem, with or without scaling, may provide a normalized matrix U' to further processing stages, such as the stage of performing lattice vector quantization, LVQ, 406.

This may involve selecting a lattice L having a set of basis vectors as a function of the selected dimensional parameter d, the lattice L configured to be used as scheme of quantization, where the lattice L may comprise a finite set of points indicated as codebook CB, for instance CB may contain 256 lattice points having a lowest norm, where the lattice points are the codewords cw.

As exemplified herein, performing LVQ to normalized weights comprises mapping each column of the normalized matrix to a nearest codeword thereof in the codebook CB.

A method as discussed in document Conway, J., and N. Sloane: "Fast quantizing and decoding and algorithms for lattice quantizers and codes", *IEEE Transactions on Information Theory* 28.2 (1982): 227-232, was found advantageous in performing such mapping, as appreciable to those of skill in the art. That document discusses a very fast algorithm for finding, for each of the lattices A_{n}(n geq 1), D_{n}(n geq 2), E_{6}, E_{7}, E_{8} and their duals, the closest lattice point to an arbitrary point, so that if these lattices are used for vector quantizing of uniformly distributed data, the algorithm finds the minimum distortion lattice point and if the lattices are used as codes for a Gaussian channel, the algorithm performs maximum likelihood decoding.

Figure 8:
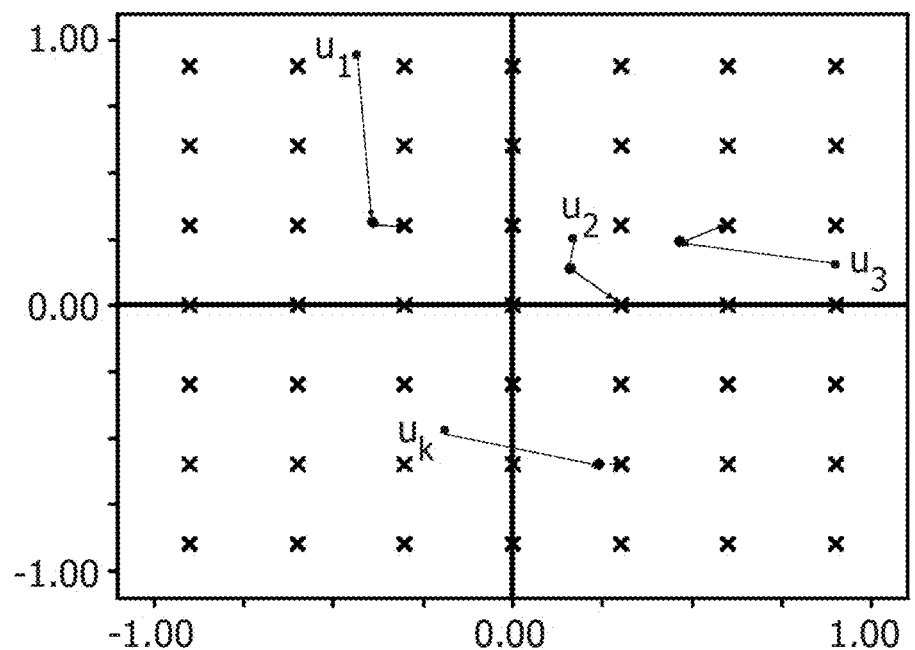
FIG. 8 is a diagram exemplary of principles underlying one or more embodiments.

FIG. 8 is a diagram exemplary of stages of such mapping processing.

As exemplified in FIG. 8, performing weight compression of any weight vector u1, u2, u3, $u_k$ involves:
  performing a projection of the weight vector close to a lattice point of the selected lattice L, as indicated in the diagram by the arrows starting from respective weight vector points which represent the shift given by the optimization; and
  performing a quantization of the vector to the closest lattice point, as indicated by the arrows in dashed lines reaching respective crossed lattice points in the lattice L.

A method discussed in document Rault, P. and Guillemot, C.: "Indexing algorithms for Zn, An, Dn, and Dn++ lattice vector quantizers", Multimedia, IEEE Transactions on. 3. 395-404, doi: 10.1109/6046.966111, was found to be advantageous in indexing lattice points 408.

As exemplified herein, indexing lattice points 408 may comprise encoding any lattice point x to a tuple of indices $(i_s, i_a, i_a^{LUT})$ which may comprise:
  normalizing the lattice point x with respect to the fixed maximum norm of the lattice L;
  computing the signed leader $l_s$ and the absolute leader $l_a$ of x;
  computing a first index $i_s$ of the tuple of indices of the lattice point x as a function of the lattice point x and the computed signed leader $l_s$;
  computing a second index $i_s$ of the lattice point x as a function of the computed signed leader $l_s$ and the computed absolute leader $l_a$; and
  storing the computed absolute leader $l_a$ in a look-up table (LUT) and compute a third index $i_a^{LUT}$ as a function of the LUT.

As exemplified herein, indexing 408 may be performed in such a way that storing indexed codewords uses a reduced amount of memory with respect to storing the full codebook, resulting beneficial to the overall compression of the network weights.

A memory impact of uncompressed weight values may be estimated to be given by an amount of 32 bits per weight values (assuming float representation), this number of bits multiplied by the number of weights.

The memory footprint of using the method 40 and in particular of indexing 407 may be solely that used to store the LUT with the absolute leaders values and to store the tuple of indexes values, facilitating a reduced memory footprint of CNN processing. The NPU 20 may subsequently use compressed weights with a reduced memory to store such weights. Tables I and II in the following provide estimates of a memory impact of the method 40 as exemplified herein.

TABLE I

| #CW | d | Max norm | Bits $i_a^{LUT}$ | Bits $i_s$ | Bits $i_a$ | Tot bits | LUT overhead [KB] | Compression ratio |
|---|---|---|---|---|---|---|---|---|
| 256 | 2 | 595 | 8 | 1 | 2 | 11 | 0.5 | 5.81 |
| 256 | 4 | 86 | 8 | 5 | 4 | 17 | 1 | 7.52 |
| 256 | 6 | 51 | 8 | 10 | 6 | 24 | 1.5 | 8 |
| 256 | 8 | 40 | 8 | 16 | 8 | 32 | 2 | 8 |

TABLE II

| #CW | d | Max norm | Bits $i_a^{LUT}$ | Bits $i_s$ | Bits $i_a$ | Tot bits | LUT overhead [KB] | Compression ratio |
|---|---|---|---|---|---|---|---|---|
| 2048 | 2 | 5057 | 11 | 1 | 2 | 14 | 4 | 4.57 |
| 2048 | 4 | 301 | 11 | 5 | 4 | 20 | 8 | 6.4 |
| 2048 | 6 | 139 | 11 | 10 | 6 | 27 | 12 | 7.11 |
| 2048 | 8 | 99 | 11 | 16 | 8 | 35 | 16 | 7.31 |

In alternative embodiments, value of leaders may be generated through a generative function in place of being stored in the LUT.

A method as discussed in document Moureaux, J.-M, Loyer, P. and Antonini, M. "Low Complexity Indexing Method for $Z^n$ and $D_n$ Lattice Quantizers", (1999), Communications, IEEE Transactions on. 46. 1602-1609, doi: 10.1109/26.737398 may be found suitable for this purpose, as appreciable to those of skill in the art.

The following Table III may summarize how much time (in seconds) it may take to computationally generate respectively 256 and 2048 absolute leaders in different dimensions.

TABLE III

| d | Time (256 CW) | Time (2048 CW) |
|---|---|---|
| 2 | 0.76 s | 38 s |
| 4 | 0.15 s | 3.33 s |
| 6 | 0.11 s | 1.89 s |
| 8 | 0.1 s | 1.66 s |

As discussed in the foregoing, circuitry 206, 230 of the NPU 20, may be configured for:
- accessing/retrieving, from a (smaller) memory circuit, weight values compressed using the method 40 as exemplified herein, e.g., via direct memory access (DMA) circuitry 206;
- decompressing 230 the retrieved normalized weight values, e.g., on the fly; and
- performing an improved CNN processing 232, 234, 236 using the normalized weight values obtained as a result of the decompressing 230.

As exemplified herein, NPU circuits may be configured to perform a decompression method, walking backwards the steps of the (compression) method 40, for instance. The method of decompression may be configured for co-operating with the inter-related method (of compression) 40, for instance using same compression/decompression parameters, e.g., value of the dimension d of type of lattice L.

Such a method of decompression may have a low complexity from a hardware point of view, facilitating operation of a neural processing units not only in terms of memory footprint reduction associated to memory storage, but also positively impacting NPU performance by:
- facilitating transferring reduced amounts of data per weight, thus reducing the processing delay associated to weights transfers; and
- facilitating a "tighter" hardware pipelining of the CNN execution.

As exemplified herein, decompressing weights "on-the-fly" or dynamically may refer to the possibility include the decompression logic performing the task to decode the incoming stream of compressed indexes directly into or attached to the hardware convolutional unit without the need for large intermediate buffers. This can significantly improve the performance of the NPU unit 20, facilitating managing memory bottlenecks dominated critical paths when performing certain kinds of neural network workloads and operators such as Fully Connected (aka Matrix/vector multiply) and recurrent networks (RNN), Long Short Term Memory (LSTM) or Gated Recurrent Units (GRU), for instance.

Figure 9:
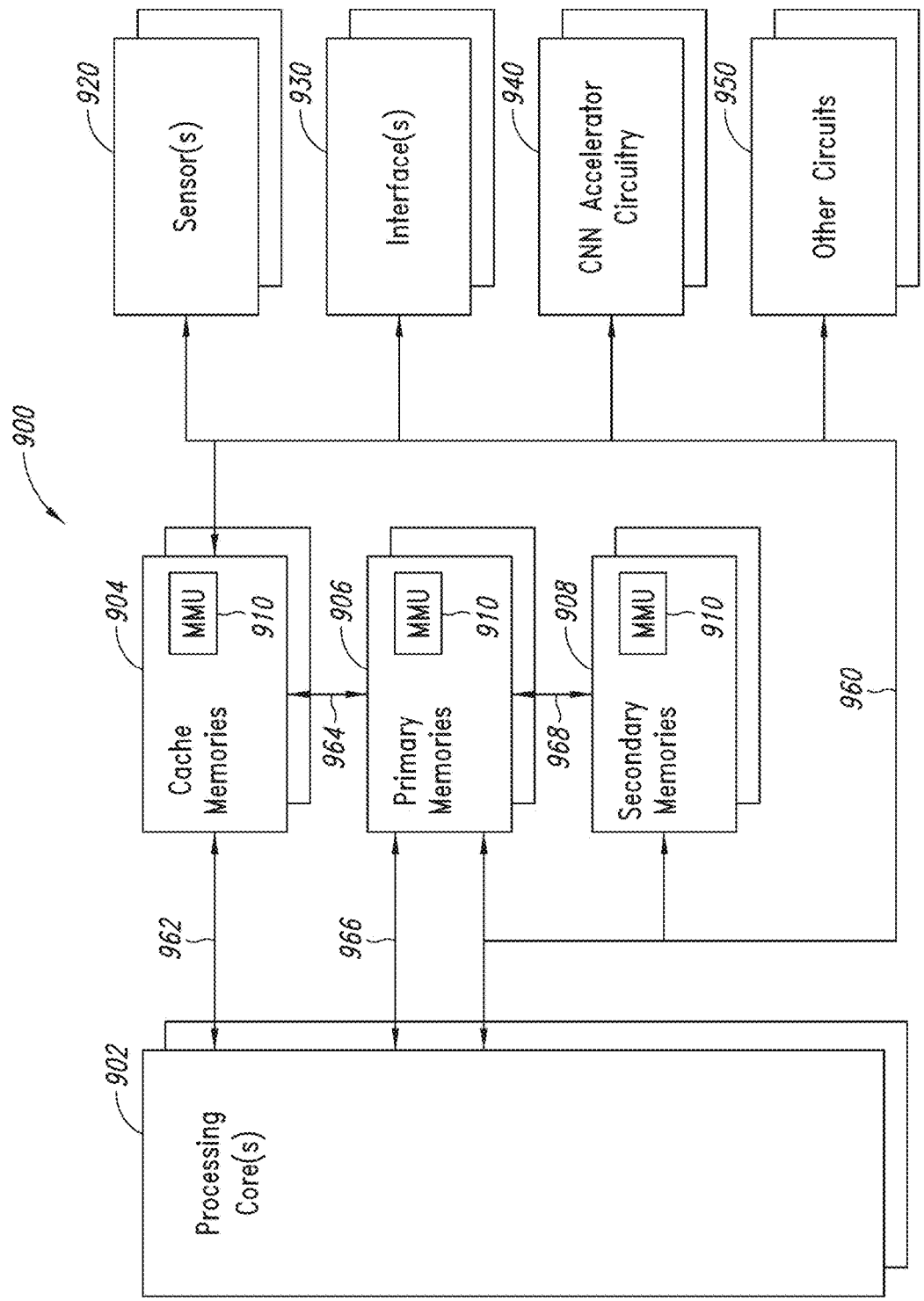
FIG. 9 is a functional block diagram of a system according to an embodiment.

FIG. 9 is a functional block diagram of an embodiment of an electronic device or system 900 of the type to which the embodiments described herein (e.g., the embodiments described above with reference to FIGS. 1-8) may apply. The system 900 comprises one or more processing cores or circuits 902. The processing cores 902 may comprise, for example, one or more processors, a state machine, a microprocessor, a programmable logic circuit, discrete circuitry, logic gates, registers, etc., and various combinations thereof. The processing cores may control overall operation of the system 900, execution of application programs by the system 900, etc.

The system 900 includes one or more memories, such as one or more volatile and/or non-volatile memories which may store, for example, all or part of instructions and data related to control of the system 900, applications and operations performed by the system 900, etc. As illustrated, the system 900 includes one or more cache memories 904, one or more primary memories 906, and one or more secondary memories 908, each comprising memory management circuitry or MMUs 910. One or more of the memories 904, 906, 908 may include a memory array, which, in operation, may be shared by one or more processes executed by the system 900.

The system 900 may include one or more sensors 920 (e.g., accelerometers, pressure sensors, temperature sensors, etc.), one or more interfaces 930 (e.g., wireless communication interfaces, wired communication interfaces, etc.), one or more ANN circuits, as illustrated convolutional neural network (CNN) accelerator circuits 940, and other circuits 950, which may include other functional circuits, antennas, power supplies, etc., and a main bus system 960. The main bus system 960 may include one or more data, address, power and/or control buses coupled to the various components of the system 900. The system 900 also may include additional bus systems such as bus system 962, which communicatively couples the cache memory 904 and the processing core 902, bus system 964, which communicatively couples the cache memory 904 and the primary memory 906, bus system 966, which communicatively couples the primary memory 906 and the processing core 902, and bus system 968, which communicatively couples the primary memory 906 and the secondary memory 908.

The primary memory or memories 906 are typically the working memory of the system 900 (e.g., the memory or memories upon which the processing cores 902 work or upon which co-processors such as the CNN accelerator circuitry 940 work), and may typically be a volatile memory (e.g., DRAM) of a limited size storing code and data related to processes executed by the system 900. For convenience, reference herein to data stored in a memory may also refer to code stored in a memory. Non-volatile memories, such as SRAM, ReRAM, PCM, MRAM, FRAM, multilevel memories, etc., may be employed as or in the primary memory or memories in an embodiment. The secondary memory 908 may typically be a non-volatile memory, which stores instructions and data, which may be retrieved and stored in the primary memory 906 when needed by the system 900. The cache memory 904 may be a relatively fast memory compared to the secondary memory 908 and typically has a limited size, which may be larger than a size of the primary memory 906.

The cache memory 904 temporarily stores code and data for later use by the system 900. Instead of retrieving needed code or data from the secondary memory 908 for storage in the primary memory 906, the system 900 may check the cache memory 904 first to see if the data or code is already stored in the cache memory 904. A cache memory 904 may significantly improve performance of a system, such as the system 900, by reducing the time and other resources needed to retrieve data and code for use by the system 900. When code and data are retrieved (e.g., from the secondary memory 908) for use by the system 900, or when data or code are written (e.g., to the primary memory 906 or to the secondary memory 908), a copy of the data or code may be stored in the cache memory 904 for later use by the system 900. Various cache management routines may be employed to control the data stored in the cache memory or memories 904.

Example embodiments are summarized below, with example references to the figures. A computer-implemented method (for instance, 40) as exemplified herein comprises:

providing an artificial neural network, ANN, processing stage (for instance, 10) comprising a plurality of processing layers (for instance, 100, 102, 104, 106, 108) having respective processing layer parameters (for instance, $L_1$, $L_2$, $L_3$, $L_4$), said processing layer parameters including at least one set of weight parameters (for instance, $w_i$), at least one input activation parameter (for instance, $a_j$), at least one output activation parameter (for instance, $b_j$) and at least one activation function parameter (for instance, p);

setting a dimensional parameter (for instance, d) of a lattice to an integer value, said lattice having a plurality of lattice points and identified by a set of basis vectors (for instance, $b_1$, $b_2$);

selecting (for instance, 400) a set of weight parameters (for instance, $w_i$) of a respective processing layer (for instance, 102) of said plurality of processing layers of said ANN processing stage;

applying vectorization processing (for instance, 402) to said selected set of weight parameters producing a set of weight vectors (for instance, $u_1$, $u_2$, $u_3$) as a result, and arranging said set of weight vectors as items of a matrix of weight vectors (for instance, U);

performing normalization processing (for instance, 404) of said matrix of weight vectors, producing a matrix of normalized weight vectors (for instance, U') as a result;

applying lattice vector quantization, LVQ, processing (for instance, 406) to said matrix of normalized weight vectors, producing a codebook (for instance, CB) of codewords as a result;

applying indexing processing (for instance, 408) to said produced codebook, said indexing comprising encoding codewords of the codebook as a function of the lattice L, producing respective tuples of indices (for instance, $i_s$, $i_a$, $i_a^{LUT}$) as a result; and providing said produced tuples of indices to a user circuit (for instance, 20), wherein performing said normalization processing of said matrix of weight vectors comprises computing an optimization problem having:
a first term configured to provide normalized weight values which approximate the at least output activation parameter of the ANN processing stage as a function of the at least one input activation parameter of the ANN processing stage; and
a regularization term $\Omega_L(u)$ configured to amplify normalized weight values having a short distance from said lattice points of the selected lattice.

As exemplified herein, said regularization term $\Omega_L(u)$ is configured to reach a minimum value when said distance from said lattice points of the selected lattice of an item $u_k$ of the matrix of weight vectors is negligible.

As exemplified herein, said optimization problem is expressed as:

$$\min_U \sum_{s_j \in S} \|\rho(U^T a_j) - b_j\|_2^2 + \lambda \sum_{u_k \in U} \Omega_L(u_k)$$

where
S indicates said processing layer parameters of the selected processing layer (for instance, 102) of said plurality of processing layers of said artificial neural network, $a_j$, resp. $b_j$, is the input, resp. the output, activation parameter of said processing layer parameters of the selected processing layer of said plurality of processing layers of said artificial neural network, $\rho$ is the activation function parameter of said processing layer parameters of the selected processing layer of said plurality of processing layers of said artificial neural network, $u_k$ is an item of the matrix of weight vectors, and
$\lambda$ is a scaling factor.

As exemplified herein, said regularization term $\Omega_L(u)$ is expressed as:

$$\Omega_L(u) = -\sum_{c \in L} e^{-\frac{\|u - cw\|_2^2}{2\sigma^2}}$$

where:
$\sigma^2$ is a statistical variance parameter; and
cw is a basis vector of said set of basis vectors identifying said lattice.

As exemplified herein, computing said regularization term $\Omega_L(u)$ comprises applying to the matrix of normalized weight vectors a further scaling factor (for instance, $\lambda_1$, $\lambda_2$, $\lambda_3$), having a value between 0 and 1, for instance.

As exemplified herein, said normalization processing comprises computing said optimization problem using stochastic gradient descent, SGD, processing.

As exemplified herein, performing said vectorization of weight values comprises:
processing elements of the at least one set of weight parameters (for instance, $w_i$) along a certain ordered sequence of dimensions (for instance, C, T, H, K);
along said ordered sequence of dimensions, extracting weight values from the at least one set of weight parameters; and
providing a set of weight vectors (for instance, $u_1$, $u_2$, $u_3$) by arranging said extracted weight values as elements of respective vectors of said set of vectors, wherein weight vectors of said set of weight vectors have a respective vector size equal to said integer value of the dimensional parameter (for instance, d).

As exemplified herein, said LVQ processing comprises:
as a function of said integer value of said dimensional parameter (for instance, d), selecting the lattice having a plurality of lattice points and a set of basis vectors; and
applying quantization to said set of weight vectors using the set of basis vectors of the selected lattice.

As exemplified herein, said ANN processing stage is a convolutional neural network, CNN, processing stage.

A computer program product as exemplified herein comprises instructions which, when the program is executed by a computer, cause the computer to carry out the method as exemplified herein.

A computer-readable medium has exemplified herein has stored therein normalized weight values obtained using the method as exemplified herein.

A method of operating a hardware accelerator engine configured to perform artificial neural network, ANN, processing as a function of weight values, as exemplified herein, comprises:
accessing (for instance, 206) normalized weight values obtained using the method as exemplified herein;
decompressing (for instance, 230) the normalized weight values accessed to produce decompressed weight values; and performing artificial neural network, ANN processing (for instance, 10) as a function of said decompressed weight values.

A computer program product as exemplified herein comprises instructions which, when the program is executed by a computer, cause the computer to carry out the method of operating a hardware accelerator engine.

A computer-readable medium as exemplified herein, comprises instructions which, when executed by a computer, cause the computer to carry out the method of operating a hardware accelerator engine.

A hardware accelerator engine circuit (for instance, 20) as exemplified herein, comprises memory circuitry having stored therein:
  normalized weight values obtained using the method; and
  instructions which, when executed in the hardware accelerator engine, cause the hardware accelerator engine to:
    access (for instance, 206) said normalized weight values;
    decompress (for instance, 230) the normalized weight values accessed to produce decompressed weight values; and
    perform ANN processing (for instance, 10) as a function of said decompressed weight values.

It will be otherwise understood that the various individual implementing options exemplified throughout the figures accompanying this description are not necessarily intended to be adopted in the same combinations exemplified in the figures. One or more embodiments may thus adopt these (otherwise non-mandatory) options individually and/or in different combinations with respect to the combination exemplified in the accompanying figures.

Without prejudice to the underlying principles, the details and embodiments may vary, even significantly, with respect to what has been described by way of example only, without departing from the extent of protection. The extent of protection is defined by the annexed claims.

In an embodiment, a computer-implemented method comprises: providing an artificial neural network, ANN, processing stage comprising a plurality of processing layers having respective processing layer parameters, the processing layer parameters including at least one set of weight parameters, at least one input activation parameter, at least one output activation parameter and at least one activation function parameter; setting a dimensional parameter of a lattice to an integer value, the lattice having a plurality of lattice points and identified by a set of basis vectors; selecting a set of weight parameters of a respective processing layer of the plurality of processing layers of the ANN processing stage; applying vectorization processing to the selected set of weight parameters producing a set of weight vectors as a result, and arranging the set of weight vectors as items of a matrix of weight vectors; performing normalization processing of the matrix of weight vectors, producing a matrix of normalized weight vectors as a result; applying lattice vector quantization, LVQ, processing to the matrix of normalized weight vectors, producing a codebook of codewords as a result; applying indexing processing to the produced codebook, the indexing comprising encoding codewords of the codebook as a function of the lattice L, producing respective tuples of indices as a result; and providing the produced tuples of indices to a user circuit, wherein performing the normalization processing of the matrix of weight vectors comprises computing an optimization problem having: a first term configured to provide normalized weight values which approximate the at least one output activation parameter of the ANN processing stage as a function of the at least one input activation parameter of the ANN processing stage; and a regularization term $\Omega_L$ configured to amplify normalized weight values having a short distance from the lattice points of the selected lattice.

In an embodiment, a method, comprises: implementing an artificial neural network (ANN) having a plurality of processing layers with respective processing layer parameters, the processing layer parameters including at least one set of weight parameters ($w_i$), at least one input activation parameter ($a_j$), at least one output activation parameter ($b_j$) and at least one activation function parameter ($\rho$); setting a dimensional parameter (d) of a lattice to an integer value, the lattice having a plurality of lattice points and identified by a set of basis vectors ($b_1$, $b_2$); selecting a set of weight parameters ($w_i$) of a respective processing layer of the plurality of processing layers of the ANN; applying vectorization processing to the selected set of weight parameters ($w_i$), producing a set of weight vectors ($u_1$, $u_2$, $u_3$), and arranging the set of weight vectors ($u_1$, $u_2$, $u_3$) as a matrix of weight vectors (U); performing normalization processing of the matrix of weight vectors (U), producing a matrix of normalized weight vectors (U'); applying lattice vector quantization (LVQ) processing to the matrix of normalized weight vectors (U'), producing a codebook of codewords; applying indexing processing to the produced codebook, the indexing comprising encoding codewords of the codebook as a function of the lattice, producing respective tuples of indices ($i_s$, $i_a$, $i_a^{LUT}$); and providing the produced tuples of indices ($i_s$, $i_a$, $i_a^{LUT}$) to a neural processing circuit of the ANN, wherein performing the normalization processing of the matrix of weight vectors (U) comprises solving an optimization problem having: a first term to provide normalized weight values which approximate the at least one output activation parameter ($b_j$) of the ANN as a function of the at least one input activation parameter ($a_j$) of the ANN; and a regularization term $\Omega_L(u)$ to amplify normalized weight values distanced from the lattice points of the selected lattice. In an embodiment, the regularization term $\Omega_L(u)$ reaches a minimum value when the distance from the lattice points of the selected lattice of an item $u_k$ of the matrix of weight vectors (U) is negligible. In an embodiment, the optimization problem is expressed as:

$$\min_U \sum_{s_j \in S} \|\rho(U^T a_j) - b_j\|_2^2 + \lambda \sum_{u_k \in U} \Omega_L(u_k)$$

where
  S indicates the processing layer parameters of the selected processing layer of the plurality of processing layers of the ANN,
  $a_j$ is the input activation parameter and $b_j$ is the output activation parameter of the processing layer parameters of the selected processing layer of the plurality of processing layers of the ANN,
  $\rho$ is the activation function parameter of the processing layer parameters of the selected processing layer of the plurality of processing layers of the ANN,
  $u_k$ is an item of the matrix of weight vectors, and
  $\lambda$ is a scaling factor.

In an embodiment, the regularization term $\Omega_L$ is expressed as:

$$\Omega_L(u) = -\sum_{c \in L} e^{-\frac{\|u - cw\|_2^2}{2\sigma^2}}$$

where:
σ² is a statistical variance parameter; and
cw is a basis vector of the set of basis vectors identifying the lattice.

In an embodiment, solving the optimization problem comprises applying a second scaling factor to the matrix of normalized weight vectors (U). In an embodiment, the second scaling factor has a value between 0 and 1. In an embodiment, the normalization processing comprises solving the optimization problem using stochastic gradient descent (SGD) processing. In an embodiment, performing the vectorization of weight values comprises: processing elements of the at least one set of weight parameters ($w_i$) along an ordered sequence of dimensions; along the ordered sequence of dimensions, extracting weight values from the at least one set of weight parameters ($w_i$); and providing a set of weight vectors ($u_1$, $u_2$, $u_3$) by arranging the extracted weight values as elements of respective vectors of the set of vectors ($u_1$, $u_2$, $u_3$), wherein weight vectors of the set of weight vectors ($u_1$, $u_2$, $u_3$) have a respective vector size equal to the integer value of the dimensional parameter (d). In an embodiment, the LVQ processing comprises: as a function of the integer value of the dimensional parameter (d), selecting the lattice having a plurality of lattice points and a set of basis vectors; and applying quantization to the set of weight vectors ($u_1$, $u_2$, $u_3$) using the set of basis vectors of the selected lattice. In an embodiment, the ANN is a convolutional neural network (CNN). In an embodiment, the method comprises: accessing normalized weight values of the matrix of normalized weight vectors; decompressing the normalized weight values accessed to produce decompressed weight values; and performing, using a hardware accelerator engine of the ANN, an operation as a function of the decompressed weight values.

In an embodiment, a non-transitory computer-readable medium's contents configured a computing system to perform a method, the method comprising: implementing an artificial neural network (ANN) having a plurality of processing layers with respective processing layer parameters, the processing layer parameters including at least one set of weight parameters ($w_i$), at least one input activation parameter ($a_j$), at least one output activation parameter ($b_j$) and at least one activation function parameter (ρ); setting a dimensional parameter (d) of a lattice to an integer value, the lattice having a plurality of lattice points and identified by a set of basis vectors ($b_1$, $b_2$); selecting a set of weight parameters ($w_i$) of a respective processing layer of the plurality of processing layers of the ANN; applying vectorization processing to the selected set of weight parameters ($w_i$), producing a set of weight vectors ($u_1$, $u_2$, $u_3$), and arranging the set of weight vectors ($u_1$, $u_2$, $u_3$) as a matrix of weight vectors (U); performing normalization processing of the matrix of weight vectors (U), producing a matrix of normalized weight vectors (U'); applying lattice vector quantization (LVQ) processing to the matrix of normalized weight vectors (U'), producing a codebook of codewords; applying indexing processing to the produced codebook, the indexing comprising encoding codewords of the codebook as a function of the lattice, producing respective tuples of indices ($i_s$, $i_a$, $i_a^{LUT}$); and providing the produced tuples of indices ($i_s$, $i_a$, $i_a^{LUT}$) to a neural processing circuit of the ANN, wherein performing the normalization processing of the matrix of weight vectors (U) comprises solving an optimization problem having: a first term to provide normalized weight values which approximate the at least one output activation parameter ($b_j$) of the ANN as a function of the at least one input activation parameter ($a_j$) of the ANN;

and a regularization term $\Omega_L(u)$ to amplify normalized weight values distanced from the lattice points of the selected lattice. In an embodiment, the optimization problem is expressed as:

$$\min_U \sum_{s_j \in S} \|\rho(U^T a_j) - b_j\|_2^2 + \lambda \sum_{u_k \in U} \Omega_L(u_k)$$

where
S indicates the processing layer parameters of the selected processing layer of the plurality of processing layers of the ANN,
$a_j$ is the input activation parameter and $b_j$ is the output activation parameter of the processing layer parameters of the selected processing layer of the plurality of processing layers of the ANN,
ρ is the activation function parameter of the processing layer parameters of the selected processing layer of the plurality of processing layers of the ANN,
$u_k$ is an item of the matrix of weight vectors, and
λ is a scaling factor.

In an embodiment, the method comprises: accessing normalized weight values of the matrix of normalized weight vectors; decompressing the normalized weight values accessed to produce decompressed weight values; and performing, using a hardware accelerator engine of the ANN, an operation as a function of the decompressed weight values. In an embodiment, the contents comprise instructions, which, when executed by the computing system, cause the computing system to perform the method.

In an embodiment, a device comprises: a memory; and processing circuitry coupled to the memory, wherein the processing circuitry, in operation: sets a dimensional parameter (d) of a lattice to an integer value, the lattice having a plurality of lattice points and identified by a set of basis vectors ($b_1$, $b_2$); selects a set of weight parameters ($w_i$) of a respective processing layer of a plurality of processing layers of an artificial neural network (ANN), the ANN having a plurality of processing layers with respective processing layer parameters, the processing layer parameters including at least one set of weight parameters ($w_i$), at least one input activation parameter ($a_j$), at least one output activation parameter ($b_j$) and at least one activation function parameter (ρ); applies vectorization processing to the selected set of weight parameters ($w_i$), producing a set of weight vectors ($u_1$, $u_2$, $u_3$), and arranging the set of weight vectors ($u_1$, $u_2$, $u_3$) as a matrix of weight vectors (U); performs normalization processing of the matrix of weight vectors (U), producing a matrix of normalized weight vectors (U'); applies lattice vector quantization (LVQ) processing to the matrix of normalized weight vectors (U'), producing a codebook of codewords; and indexes the produced codebook, the indexing comprising encoding codewords of the codebook as a function of the lattice, producing respective tuples of indices ($i_s$, $i_a$, $i_a^{LUT}$), wherein performing the normalization processing of the matrix of weight vectors (U) comprises solving an optimization problem having: a first term to provide normalized weight values which approximate the at least one output activation parameter ($b_j$) of the ANN as a function of the at least one input activation parameter ($a_j$) of the ANN; and a regularization term $\Omega_L(u)$ to amplify normalized weight values distanced from the lattice points of the selected lattice. In an embodiment, the regularization term $\Omega_L(u)$ reaches a minimum value when the distance from the lattice points of the selected lattice of an item $u_k$ of the matrix of weight vectors (U) is negligible. In an embodiment, the optimization problem is expressed as:

$$\min_{U} \sum_{s_j \in S} \|\rho(U^T a_j) - b_j\|_2^2 + \lambda \sum_{u_k \in U} \Omega_L(u_k)$$

where

S indicates the processing layer parameters of the selected processing layer of the plurality of processing layers of the ANN, $a_j$ is the input activation parameter and $b_j$ is the output activation parameter of the processing layer parameters of the selected processing layer of the plurality of processing layers of the ANN, $\rho$ is the activation function parameter of the processing layer parameters of the selected processing layer of the plurality of processing layers of the ANN, $u_k$ is an item of the matrix of weight vectors, and $\lambda$ is a scaling factor.

In an embodiment, the regularization term $\Omega_L$ is expressed as:

$$\Omega_L(u) = -\sum_{c \in L} e^{-\frac{\|u - cw\|_2^2}{2\sigma^2}}$$

where:

$\sigma^2$ is a statistical variance parameter; and cw is a basis vector of the set of basis vectors identifying the lattice.

In an embodiment, solving the optimization problem comprises applying a second scaling factor to the matrix of normalized weight vectors (U). In an embodiment, the second scaling factor has a value between 0 and 1. In an embodiment, the normalization processing comprises solving the optimization problem using stochastic gradient descent (SGD) processing. In an embodiment, performing the vectorization of weight values comprises: processing elements of the at least one set of weight parameters ($w_i$) along an ordered sequence of dimensions; along the ordered sequence of dimensions, extracting weight values from the at least one set of weight parameters ($w_i$); and providing a set of weight vectors ($u_1$, $u_2$, $u_3$) by arranging the extracted weight values as elements of respective vectors of the set of vectors ($u_1$, $u_2$, $u_3$), wherein weight vectors of the set of weight vectors ($u_1$, $u_2$, $u_3$) have a respective vector size equal to the integer value of the dimensional parameter (d). In an embodiment. the LVQ processing comprises: as a function of the integer value of the dimensional parameter (d), selecting the lattice having a plurality of lattice points and a set of basis vectors; and applying quantization to the set of weight vectors ($u_1$, $u_2$, $u_3$) using the set of basis vectors of the selected lattice. In an embodiment, the ANN is a convolutional neural network (CNN). In an embodiment, the processing circuitry, in operation: accesses normalized weight values of the matrix of normalized weight vectors; decompresses the normalized weight values accessed to produce decompressed weight values; and performs an operation of the ANN as a function of the decompressed weight values.

In an embodiment, a system, comprises: a memory, which, in operation, stores compressed normalized weight values; a processing core; and a hardware accelerator engine coupled to the memory and the processing core, wherein the hardware accelerator engine, in operation: decompresses stored normalized weight values, producing decompressed weight values, and performs an operation of an artificial neural network (ANN) as a function of said decompressed weight values, wherein the stored compressed normalized weight values correspond to a solution to an optimization problem having: a first term to provide normalized weight values which approximate at least one output activation parameter ($b_j$) of the ANN as a function of at least one input activation parameter ($a_j$) of the ANN; and a regularization term $\Omega_L(u)$ to amplify normalized weight values distanced from the lattice points of the selected lattice. In an embodiment, the processing core, in operation, generates the stored compressed normalized weight values, the generating including: setting a dimensional parameter (d) of a lattice to an integer value, the lattice having a plurality of lattice points and identified by a set of basis vectors ($b_1$, $b_2$); selecting a set of weight parameters ($w_i$) of a respective processing layer of a plurality of processing layers of the ANN, the ANN having a plurality of processing layers with respective processing layer parameters, the processing layer parameters including the at least one set of weight parameters ($w_i$), the at least one input activation parameter ($a_j$), the at least one output activation parameter ($b_j$) and at least one activation function parameter ($\rho$); applying vectorization processing to the selected set of weight parameters ($w_i$), producing a set of weight vectors ($u_1$, $u_2$, $u_3$), and arranging the set of weight vectors ($u_1$, $u_2$, $u_3$) as a matrix of weight vectors (U); performing normalization processing of the matrix of weight vectors (U), producing a matrix of normalized weight vectors (U'); applying lattice vector quantization (LVQ) processing to the matrix of normalized weight vectors (U'), producing a codebook of codewords; and indexing the produced codebook, the indexing comprising encoding codewords of the codebook as a function of the lattice, producing respective tuples of indices ($i_s$, $i_a$, $i_a^{LUT}$) wherein performing the normalization processing of the matrix of weight vectors (U) comprises solving the optimization problem.

In an embodiment, a system comprises: a memory, which, in operation, stores compressed normalized weight values; and processing circuitry coupled to the memory. The processing circuitry, in operation: implements an artificial neural network; decompresses stored normalized weight values, producing decompressed weight values; and performs an operation of the ANN as a function of the decompressed weight values. The stored compressed normalized weight values correspond to a solution to an optimization problem having: a first term to provide normalized weight values which approximate at least one output activation parameter of the ANN as a function of at least one input activation parameter of the ANN; and a regularization term to amplify normalized weight values distanced from lattice points of a selected lattice. The system classifies an image using the ANN, the classifying including performing the operation of the ANN. In an embodiment, the processing circuitry, in operation, generates the stored compressed normalized weight values, the generating including: setting a dimensional parameter (d) of the lattice to an integer value, the lattice having a plurality of lattice points and identified by a set of basis vectors ($b_1$, $b_2$); selecting a set of weight parameters ($w_i$) of a respective processing layer of a plurality of processing layers of the ANN, the ANN having a plurality of processing layers with respective processing layer parameters, the processing layer parameters including the at least one set of weight parameters ($w_i$), the at least one input activation parameter ($a_j$), the at least one output activation parameter ($b_1$) and at least one activation function parameter ($\rho$); applying vectorization processing to the selected set of weight parameters ($w_i$), producing a set of weight vectors ($u_1$, $u_2$, $u_3$), and arranging the set of weight vectors ($u_1$, $u_2$, $u_3$) as a matrix of weight vectors (U); performing normalization processing of the matrix of weight vectors (U), producing a matrix of normalized weight vectors (U'); applying lattice vector quantization (LVQ) processing to the matrix of normalized weight vectors (U'), producing a codebook of codewords; and indexing the produced codebook, the indexing comprising encoding codewords of the codebook as a function of the lattice, producing respective tuples of indices ($i_s$, $i_a$, $i_a^{LUT}$), wherein performing the normalization processing of the matrix of weight vectors (U) comprises solving the optimization problem. In an embodiment, the the processing circuitry comprises: a processing core; and a hardware accelerator engine coupled to the memory and the processing core, wherein the hardware accelerator engine, in operation, decompresses the stored normalized weight values and performs the operation of the ANN.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
implementing an artificial neural network (ANN) having a plurality of processing layers with respective processing layer parameters, the processing layer parameters including at least one set of weight parameters ($w_i$), at least one input activation parameter ($a_j$), at least one output activation parameter ($b_j$) and at least one activation function parameter ($\rho$);
setting a dimensional parameter (d) of a lattice to an integer value, the lattice having a plurality of lattice points and identified by a set of basis vectors ($b_1$, $b_2$);
selecting a set of weight parameters ($w_i$) of a respective processing layer of the plurality of processing layers of the ANN;
applying vectorization processing to the selected set of weight parameters ($w_i$), producing a set of weight vectors ($u_1$, $u_2$, $u_3$), and arranging the set of weight vectors ($u_1$, $u_2$, $u_3$) as a matrix of weight vectors (U);
performing normalization processing of the matrix of weight vectors (U), producing a matrix of normalized weight vectors (U');
applying lattice vector quantization (LVQ) processing to the matrix of normalized weight vectors (U'), producing a codebook of codewords;
applying indexing processing to the produced codebook, the indexing comprising encoding codewords of the codebook as a function of the lattice, producing respective tuples of indices ($i_s$, $i_a$, $i_a^{LUT}$); and
providing the produced tuples of indices ($i_s$, $i_a$, $i_a^{LUT}$) t a neural processing circuit of the ANN,
wherein performing the normalization processing of the matrix of weight vectors (U) comprises solving an optimization problem having:
a first term to provide normalized weight values which approximate the at least one output activation parameter ($b_j$) of the ANN as a function of the at least one input activation parameter ($a_j$) of the ANN; and
a regularization term $\Omega_L(u)$ to amplify normalized weight values based on distances of weight values from the lattice points of the selected lattice.

2. The method of claim 1, wherein the regularization term $\Omega_L(u)$ reaches a minimum value when the distance from the lattice points of the selected lattice of an item $u_k$ of the matrix of weight vectors (U) is negligible.

3. The method of claim 1, wherein the optimization problem is expressed as:

$$\min_U \sum_{s_j \in S} \|\rho(U^T a_j) - b_j\|_2^2 + \lambda \sum_{u_k \in U} \Omega_L(u_k)$$

where
S indicates the processing layer parameters of the selected processing layer of the plurality of processing layers of the ANN,
$a_j$ is the input activation parameter and $b_j$ is the output activation parameter of the processing layer parameters of the selected processing layer of the plurality of processing layers of the ANN,
$\rho$ is the activation function parameter of the processing layer parameters of the selected processing layer of the plurality of processing layers of the ANN,
$u_k$ is an item of the matrix of weight vectors, and
$\lambda$ is a scaling factor.

4. The method of claim 3, wherein the regularization term $\Omega_L$ expressed as:

$$\Omega_L(u) = -\sum_{c \in L} e^{-\frac{\|u - cw\|_2^2}{2\sigma^2}}$$

where:
σ² is a statistical variance parameter; and
cw is a basis vector of the set of basis vectors identifying the lattice.

5. The method of claim 1, wherein performing the vectorization of weight values comprises:
processing elements of the at least one set of weight parameters ($w_i$) along an ordered sequence of dimensions;
along the ordered sequence of dimensions, extracting weight values from the at least one set of weight parameters ($w_i$); and
providing a set of weight vectors ($u_1$, $u_2$, $u_3$) by arranging the extracted weight values as elements of respective vectors of the set of vectors ($u_1$, $u_2$, $u_3$), wherein weight vectors of the set of weight vectors ($u_1$, $u_2$, $u_3$) have a respective vector size equal to the integer value of the dimensional parameter (d).

6. The method of claim 1, wherein the LVQ processing comprises:
as a function of the integer value of the dimensional parameter (d), selecting the lattice having a plurality of lattice points and a set of basis vectors; and
applying quantization to the set of weight vectors ($u_1$, $u_2$, $u_3$) using the set of basis vectors of the selected lattice.

7. The method of claim 1, comprising:
accessing normalized weight values of the matrix of normalized weight vectors;
decompressing the normalized weight values accessed to produce decompressed weight values; and
performing, using a hardware accelerator engine of the ANN, an operation as a function of the decompressed weight values.

8. A device, comprising:
a memory; and
processing circuitry coupled to the memory, wherein the processing circuitry, in operation:
sets a dimensional parameter (d) of a lattice to an integer value, the lattice having a plurality of lattice points and identified by a set of basis vectors (b1, b2);
selects a set of weight parameters ($w_i$) of a respective processing layer of a plurality of processing layers of an artificial neural network (ANN), the ANN having a plurality of processing layers with respective processing layer parameters, the processing layer parameters including at least one set of weight parameters ($w_i$), at least one input activation parameter ($a_j$), at least one output activation parameter ($b_j$) and at least one activation function parameter ($\rho$);
applies vectorization processing to the selected set of weight parameters ($w_i$), producing a set of weight vectors ($u_1$, $u_2$, $u_3$), and arranging the set of weight vectors ($u_1$, $u_2$, $u_3$) as a matrix of weight vectors (U);
performs normalization processing of the matrix of weight vectors (U), producing a matrix of normalized weight vectors (U');
applies lattice vector quantization (LVQ) processing to the matrix of normalized weight vectors (U'), producing a codebook of codewords; and
indexes the produced codebook, the indexing comprising encoding codewords of the codebook as a function of the lattice, producing respective tuples of indices ($i_s$, $i_a$, $i_a^{LUT}$), wherein performing the normalization processing of the matrix of weight vectors (U) comprises solving an optimization problem having:

a first term to provide normalized weight values which approximate the at least one output activation parameter ($b_j$) of the ANN as a function of the at least one input activation parameter ($a_j$) of the ANN; and
a regularization term $\Omega_L(u)$ to amplify normalized weight values based on distances of weight values from the lattice points of the selected lattice.

9. The device of claim 8, wherein the regularization term $\Omega_L(u)$ reaches a minimum value when the distance from the lattice points of the selected lattice of an item $u_k$ of the matrix of weight vectors (U) is negligible.

10. The device of claim 8, wherein the optimization problem is expressed as:

$$\min_U \sum_{s_j \in S} \|\rho(U^T a_j) - b_j\|_2^2 + \lambda \sum_{u_k \in U} \Omega_L(u_k)$$

where
S indicates the processing layer parameters of the selected processing layer of the plurality of processing layers of the ANN,
$a_j$ is the input activation parameter and $b_j$ is the output activation parameter of the processing layer parameters of the selected processing layer of the plurality of processing layers of the ANN,
$\rho$ is the activation function parameter of the processing layer parameters of the selected processing layer of the plurality of processing layers of the ANN,
$u_k$ is an item of the matrix of weight vectors, and
$\lambda$ is a scaling factor.

11. The device of claim 8, wherein the regularization term S is expressed as:

$$\Omega_L(u) = -\sum_{c \in L} e^{-\frac{\|u-cw\|_2^2}{2\sigma^2}}$$

where:
σ² is a statistical variance parameter; and
cw is a basis vector of the set of basis vectors identifying the lattice.

12. The device of claim 11, wherein solving the optimization problem comprises applying a second scaling factor to the matrix of normalized weight vectors (U).

13. The device of claim 8, wherein performing the vectorization of weight values comprises:
processing elements of the at least one set of weight parameters ($w_i$) along an ordered sequence of dimensions;
along the ordered sequence of dimensions, extracting weight values from the at least one set of weight parameters ($w_i$); and
providing a set of weight vectors ($u_1$, $u_2$, $u_3$) by arranging the extracted weight values as elements of respective vectors of the set of vectors ($u_1$, $u_2$, $u_3$), wherein weight vectors of the set of weight vectors ($u_1$, $u_2$, $u_3$) have a respective vector size equal to the integer value of the dimensional parameter (d).

14. The device of claim 8, wherein the LVQ processing comprises:
as a function of the integer value of the dimensional parameter (d), selecting the lattice having a plurality of lattice points and a set of basis vectors; and applying quantization to the set of weight vectors ($u_1$, $u_2$, $u_3$) using the set of basis vectors of the selected lattice.

15. The device of claim 8, wherein the processing circuitry, in operation:
   accesses normalized weight values of the matrix of normalized weight vectors;
   decompresses the normalized weight values accessed to produce decompressed weight values; and
   performs an operation of the ANN as a function of the decompressed weight values.

16. A system, comprising:
   a memory, which, in operation, stores compressed normalized weight values;
   a processing core; and
   a hardware accelerator engine coupled to the memory and the processing core, wherein the hardware accelerator engine, in operation:
      decompresses stored normalized weight values, producing decompressed weight values; and
      performs an operation of an artificial neural network (ANN) as a function of said decompressed weight values, wherein the stored compressed normalized weight values correspond to a solution to an optimization problem having:
         a first term to provide normalized weight values which approximate at least one output activation parameter ($b_j$) of the ANN as a function of at least one input activation parameter ($a_j$) of the ANN; and
         a regularization term $\Omega_L(u)$ to amplify normalized weight values based on distances of weight values from lattice points of a selected lattice.

17. The system of claim 16, wherein the processing core, in operation, generates the stored compressed normalized weight values, the generating including:
   setting a dimensional parameter (d) of the lattice to an integer value, the lattice having a plurality of lattice points and identified by a set of basis vectors ($b_1$, $b_2$);
   selecting a set of weight parameters ($w_i$) of a respective processing layer of a plurality of processing layers of the ANN, the ANN having a plurality of processing layers with respective processing layer parameters, the processing layer parameters including the at least one set of weight parameters ($w_i$), the at least one input activation parameter ($a_j$), the at least one output activation parameter ($b_j$) and at least one activation function parameter ($\rho$);
   applying vectorization processing to the selected set of weight parameters ($w_i$), producing a set of weight vectors ($u_1$, $u_2$, $u_3$), and arranging the set of weight vectors ($u_1$, $u_2$, $u_3$) as a matrix of weight vectors (U);
   performing normalization processing of the matrix of weight vectors (U), producing a matrix of normalized weight vectors (U');
   applying lattice vector quantization (LVQ) processing to the matrix of normalized weight vectors (U'), producing a codebook of codewords; and
   indexing the produced codebook, the indexing comprising encoding codewords of the codebook as a function of the lattice, producing respective tuples of indices ($i_s$, $i_a$, $i_a^{LUT}$), wherein performing the normalization processing of the matrix of weight vectors (U) comprises solving the optimization problem.

18. A system, comprising:
   a memory, which, in operation, stores compressed normalized weight values; and
   processing circuitry coupled to the memory, wherein the processing circuitry, in operation:
      implements an artificial neural network;
      decompresses stored normalized weight values, producing decompressed weight values; and
      performs an operation of the ANN as a function of the decompressed weight values, wherein the stored compressed normalized weight values correspond to a solution to an optimization problem having:
         a first term to provide normalized weight values which approximate at least one output activation parameter of the ANN as a function of at least one input activation parameter of the ANN; and
         a regularization term to amplify normalized weight values based on distances of weight values from lattice points of a selected lattice; and
      classifies an image using the ANN, the classifying including performing the operation of the ANN.

19. The system of claim 18, wherein the processing circuitry, in operation, generates the stored compressed normalized weight values, the generating including:
   setting a dimensional parameter (d) of the lattice to an integer value, the lattice having a plurality of lattice points and identified by a set of basis vectors ($b_1$, $b_2$);
   selecting a set of weight parameters ($w_i$) of a respective processing layer of a plurality of processing layers of the ANN, the ANN having a plurality of processing layers with respective processing layer parameters, the processing layer parameters including the at least one set of weight parameters ($w_i$), the at least one input activation parameter ($a_j$), the at least one output activation parameter ($b_j$) and at least one activation function parameter ($\rho$);
   applying vectorization processing to the selected set of weight parameters ($w_i$), producing a set of weight vectors ($u_1$, $u_2$, $u_3$), and arranging the set of weight vectors ($u_1$, $u_2$, $u_3$) as a matrix of weight vectors (U);
   performing normalization processing of the matrix of weight vectors (U), producing a matrix of normalized weight vectors (U');
   applying lattice vector quantization (LVQ) processing to the matrix of normalized weight vectors (U'), producing a codebook of codewords; and
   indexing the produced codebook, the indexing comprising encoding codewords of the codebook as a function of the lattice, producing respective tuples of indices ($i_s$, $i_a$, $i_a^{LUT}$), wherein performing the normalization processing of the matrix of weight vectors (U) comprises solving the optimization problem.

20. The system of claim 18, wherein the processing circuitry comprises:
   a processing core; and
   a hardware accelerator engine coupled to the memory and the processing core, wherein the hardware accelerator engine, in operation, decompresses the stored normalized weight values and performs the operation of the ANN.

* * * * *